(12) United States Patent
Baucom et al.

(10) Patent No.: US 12,009,531 B1
(45) Date of Patent: Jun. 11, 2024

(54) INTERNALLY ENCLOSED SUPPORT SYSTEM FOR BATTERIES, FABRICATION TECHNIQUES AND APPLICATIONS FOR THE SAME

(71) Applicant: Lyten, Inc., San Jose, CA (US)

(72) Inventors: Jesse Baucom, Santa Clara, CA (US);
Zach Favors, Reno, NV (US); Bryce H. Anzelmo, Parsippany, NJ (US);
Kevin Rhodes, Dearborn, MI (US)

(73) Assignee: LYTEN, INC., San Jose, CA (US)

( * ) Notice: Subject to any disclaimer, the term of this patent is extended or adjusted under 35 U.S.C. 154(b) by 0 days.

(21) Appl. No.: 18/216,340

(22) Filed: Jun. 29, 2023

(51) Int. Cl.
*H01M 50/121* (2021.01)
*H01M 4/66* (2006.01)

(52) U.S. Cl.
CPC ......... *H01M 50/121* (2021.01); *H01M 4/666* (2013.01)

(58) Field of Classification Search
CPC ............................ H01M 50/121; H01M 4/666
See application file for complete search history.

(56) References Cited

U.S. PATENT DOCUMENTS

| | | | |
|---|---|---|---|
| 6,537,703 | B2 | 3/2003 | DuPasquier et al. |
| 9,761,854 | B2 | 9/2017 | Hoshiba et al. |
| 10,418,638 | B2 | 9/2019 | Woo |
| 2001/0024756 | A1* | 9/2001 | Yamasaki ........... H01M 50/417 29/623.5 |
| 2003/0059670 | A1* | 3/2003 | Bechtold ........... H01M 10/0431 429/185 |
| 2004/0241537 | A1* | 12/2004 | Okuyama ........... H01M 50/136 429/530 |
| 2022/0052385 | A1* | 2/2022 | Shi ........................ H01M 4/661 |

OTHER PUBLICATIONS

Zhang et al., "Lithiophilic 3D Porous CuZn Current Collector for Stable Lithium Metal Batteries," ACS Energy Letters. vol. 5, 2020, pp. 180-186.

(Continued)

*Primary Examiner* — Jimmy Vo
(74) *Attorney, Agent, or Firm* — Zilka-Kotab, P.C.

(57) ABSTRACT

Electrochemical cells and batteries including a polymeric support system in lieu of a conventional, metal-based structures. The polymer support system provides mechanical strength and mechanical flexibility to the electrochemical cells in a manner that is advantageously greater than what is provided by conventional structures, in spite of the fact that the polymer support system contributes far less to the overall weight of the electrochemical cells. The polymer support system may be present in an interior volume of an electrochemical cell, e.g., in the form of a continuous polymeric network penetrating various components of the electrochemical cell. The penetrating structures may include the anode and cathode current collectors, and any/all components therebetween. Additionally or alternatively, the polymer support system may include various forms of external support structures, chemical anchors, coatings and/or casings of the electrochemical cell. Additional advantageous characteristics include improved recyclability and increased longevity of the electrochemical cells.

30 Claims, 10 Drawing Sheets

(56) References Cited

OTHER PUBLICATIONS

Xu et al., "An Approach to Make Macroporous Metal Sheets as Current Collectors for Lithium-Ion Batteries," Journal of the Electrochemical Society, vol. 157, 2010, pp. A765-A769.
Yamada et al., "Review of the Design of Current Collectors for Improving the Battery Performance in Lithium-Ion and Post-Lithium-Ion Batteries," Electrochem, vol. 1, 2020, pp. 124-159.
Li et al., "Hierarchically porous membranes for lithium rechargeable batteries: Recent progress and opportunities," EcoMat, 2022, pp. 1-3.
Anzelmo et al., U.S. Appl. No. 18/216,351, filed Jun. 29, 2023.
Anzelmo et al., U.S. Appl. No. 18/216,379, filed Jun. 29, 2023.
Anzelmo et al., U.S. Appl. No. 18/216,384 , filed Jun. 29, 2023.
Kalnaus et al., "Mechanical behavior and failure mechanisms of Li-ion battery separators," Journal of Power Sources, vol. 348, Mar. 9, 2017, 18 pages, retrieved from https://www.osti.gov/pages/biblio/1346671.
Kaliaperumal et al., "Cause and Mitigation of Lithium-Ion Battery Failure—A Review," Materials, vol. 14, 2021, pp. 1-38.

\* cited by examiner

INTERNALLY ENCLOSED SUPPORT SYSTEM FOR BATTERIES, FABRICATION TECHNIQUES AND APPLICATIONS FOR THE SAME

FIELD OF THE INVENTION

The present invention relates to battery technology, and more particularly to providing a polymeric support system configured to mechanically support and/or protect components of an electrochemical cell.

BACKGROUND

Batteries, particularly lithium-based batteries, are known to experience volumetric change over the course of operational lifetime, due to formation of gases during normal cycling and operation of the battery. This can lead to expansion of and within the electrochemical cell, including possible separation and delamination between the electrodes. As a result, ion transfer paths through the electrochemical cell are degraded, to the point of loss and ultimate failure of the cell.

Conventionally, expansion caused by such volumetric change is addressed by adding a compressive structure, typically a metal such as aluminum or stainless steel, to the battery structure. Most commonly, a metal casing or bands surrounding the electrochemical cell are implemented as the compressive structure. However, using conventional metal-based compressive structures undesirably adds substantial weight and cost to the battery. Typically, these metallic compressive structures represent up to 65% of the total weight of the overall battery.

The necessary added mass of the metal is particularly undesirable as it contributes to overall fabrication cost (both in terms of material cost and cost of machining and assembling the battery), as well as cost of transporting starting materials and final product from various sources to ultimate destinations. Further still, adding weight to the battery limits the performance of the machine utilizing the battery as a power source. Taking an electric vehicle as an example, as battery weight increases, so does fuel cost (either in the form of fuel consumed to charge the battery, or in the form of alternative fuel needed to power the vehicle itself), while range, carrying capacity, etc. of the vehicle are reduced.

As such, there is thus a need for addressing these and/or other issues associated with the prior art.

SUMMARY

Compositions of matter, suitable systems implementing said compositions of matter, methods of fabricating such compositions of matter and corresponding systems, as well as various applications for improving, among other characteristics, mechanical strength of batteries are disclosed according to various aspects, implementations, and embodiments of the inventive concepts presented herein.

Principally, the inventive concepts include using a polymer-based support system as the compressive structure for preventing separation and delamination of components within an electrochemical cell. The polymeric support system may be provided in the form of a casing surrounding the electrochemical cell, a continuous network of structurally coupled polymer(s) present throughout the internal volume of the electrochemical cell, a plurality of interpenetrating supports arranged within the electrochemical cell (and optionally, but preferably, anchored to an external surface of the cell and/or a polymeric casing surrounding the exterior of the electrochemical cell), a coating applied to an exterior of the electrochemical cell and/or between layers of the electrochemical cell, or any combination of such arrangements, according to various aspects of the presently disclosed inventive concepts.

To further reduce overall mass of the inventive electrochemical cells, as well as provide mechanical "anchors" for polymeric support system present within the cell, either or (preferably) both the anode, the anode current collector(s), the cathode, and the cathode current collector(s) may be perforated, may be porous, may be configured as a mesh, expanded metal, or other configuration that would be appreciated by a person having ordinary skill in the art upon reading the present disclosure as suitable for use as an anchor or other physical coupling between the polymeric support system and components of the electrochemical cell, or otherwise allowing polymeric precursors and/or polymers and accompanying compounds to occupy portion(s) of the interior volume of the corresponding component of the electrochemical cell. Moreover, to facilitate maximum improvement to mechanical strength, the polymeric support system within the electrochemical cell forms at least one, preferably many, continuous pathways between the perforated current collectors, lending mechanical (particularly tensile) strength within the electrochemical cell.

The polymeric support system may be implemented with, on, and/or within the cell in any suitable manner, including but not limited to structural arrangements, methods and/or mechanisms for curing the polymeric support system, timing of curing the polymer support, etc. For instance, according to various aspects the polymeric support system may or may not be fully formed and cured during fabrication of the battery.

In some approaches, the polymeric support system may be cured using optical energy (e.g., gamma, X-ray, ultraviolet, etc. as would be understood by skilled artisans upon reading the instant disclosure). According to such approaches, the polymeric support system (and precursors thereof) is preferably permissible or transparent to the appropriate type of optical energy to be used for initiating curing. For instance, according to one embodiment a polymeric support system comprising polycarbonate is suitable for use in combination with optical curing techniques.

Enabling curing of a polymeric support system post-fabrication advantageously simplifies the fabrication process relative to conventional processes required when relying on a conventional metal-based compressive structure.

In more approaches, curing of the polymeric support system may be kinetically controlled, e.g., by utilizing a chemical initiation reaction with sufficiently slow kinetics to delay curing of polymeric support precursors until a desired timepoint, e.g., such as during the first or first few (i.e., five or less) charge cycles of a battery. According to various embodiments, kinetically-driven curing may be tuned so that the support network is formed over a predictable duration, e.g., over a certain amount of time or number of cycles. Advantageously, this tuning allows control over a number of cycles that a battery will experience, enabling advanced safety considerations (for instance, a battery may be designed to physically fail due to expansion/separation at a number of cycles known to be less than a number of cycles where said battery is likely to experience another negative outcome, such as shorting, leakage, combustion, etc. as would be understood by a person having ordinary skill in the art upon reading this disclosure. Preferably, kinetically controlled curing may be driven in whole or in part by heat generated during the first few cycles of a battery's operational lifespan.

In still more approaches, the polymeric support system may be chemically cured, e.g., through the use of particular solvent systems, initiators, terminators, binders, cross-linkers, etc. as would be appreciated by a person having ordinary skill in the art upon reading the present disclosure.

According to particularly preferred embodiments, the polymeric support system may comprise a material that is ionically conductive to select ions, e.g., lithium ions, sulfur ions, polysulfide ions, etc. as would be understood by those having ordinary skill in the art upon reading the present descriptions.

Moreover, in some approaches the polymeric support system may serve as a substrate for functionalization, conveying or tuning certain properties of the cell. For instance, in preferred aspects graphene may be added to the polymeric network to facilitate electrical and/or thermal characteristics of the electrolyte and/or electrochemical cell as a whole.

The inventive polymeric support system may be implemented, according to various embodiments, with any suitable type of electrochemical cell, including but not limited to coin configurations, pouch cells, "jelly-roll" cell configurations, etc. without departing from the scope of the inventive concepts presented herein. Indeed, as will be appreciated by those having ordinary skill in the art upon reading the present disclosure, the presently described inventive concepts include fabricating polymeric support system (particularly when the system is to be implemented in whole or in part as an external support such as a casing, one or more bands, a mesh, etc.) using additive manufacturing techniques, injection molding techniques, compression molding techniques, hybrid injection/compression molding techniques, preforming techniques, hand layup techniques, casting techniques, infusion techniques, sintering techniques, or any combination thereof that would be appreciated by a skilled artisan upon reading the present disclosure.

DETAILED DESCRIPTION

Figure 1A:
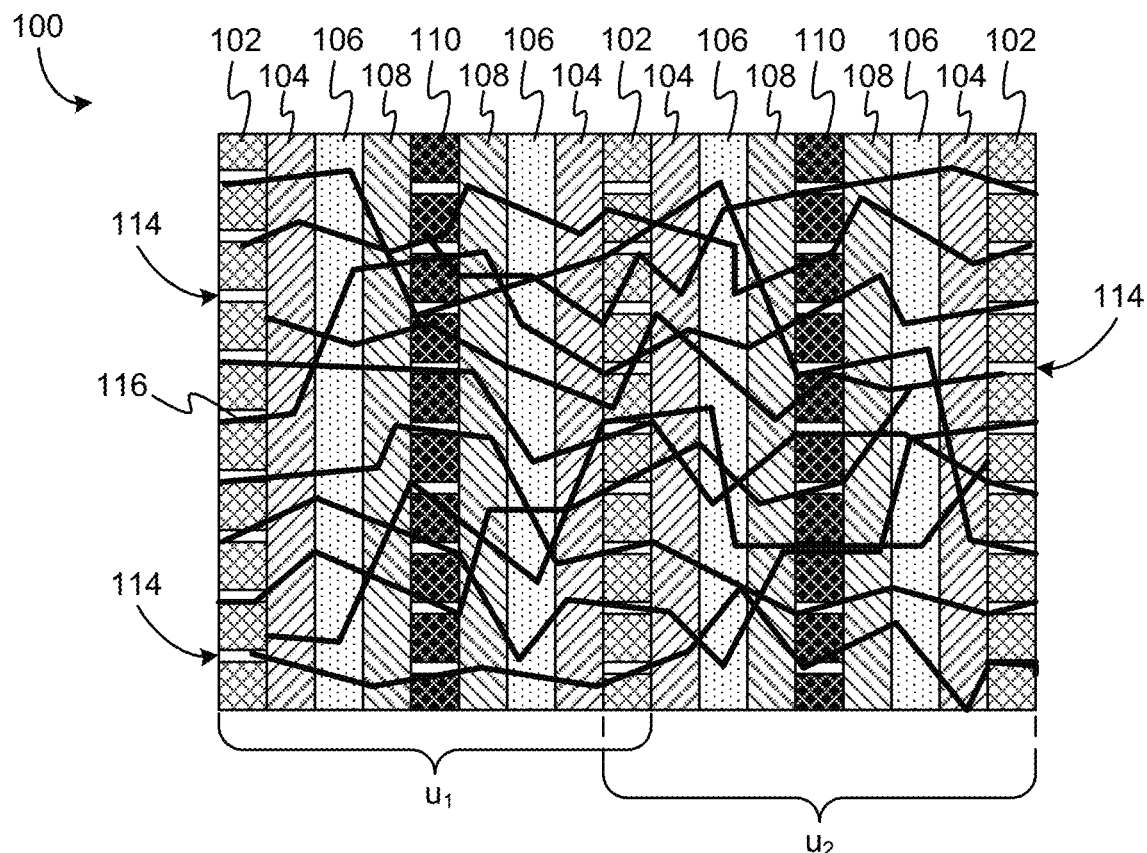
FIG. 1A illustrates a simplified schematic of an electrochemical cell having perforated current collectors and a continuous polymeric network extending throughout the interior volume of the electrochemical cell, according to one embodiment.

The following descriptions set forth various aspects, implementations, and embodiments of inventive concepts involving the use of a polymeric support system to mechanically support electrochemical cells, specifically directed to mitigating effects of volumetric change over the operational life of the electrochemical cell. The polymeric support system may include a continuous network of polymeric components extending throughout an interior volume of the cell and providing tensile strength thereto via polymeric components being anchored, preferably via covalent bonding, to current collectors of the electrochemical cell. Additionally or alternatively, a polymer support system may be anchored to the current collectors via a different physical arrangement, such as via surrounding portion(s) of the current collectors (e.g., by forming a loop in and/or around perforations, pores, etc. of the current collectors, by encasing some or all of the current collector, etc. as would be understood by a person having ordinary skill in the art upon reading the present disclosure).

General Embodiments

According to one general embodiment, a battery includes an electrochemical cell. The electrochemical cell, in turn, includes an anode; a cathode; and a porous separator that is either directly ionically coupled, or indirectly ionically coupled, to the anode and the cathode. The electrochemical cell also includes a polymer support system comprising a continuous polymer network structurally coupled to the anode and the cathode, wherein the continuous polymer network forms a plurality of continuous pathways between the anode and the cathode.

According to another general embodiment, a battery includes an electrochemical cell; and a substantially nonmetallic protective mechanism for: mitigating or preventing mechanical damage to the electrochemical cell; or mitigating or preventing electrical damage to the electrochemical cell. Importantly, a total weight of the battery is at least about 1% less than a total weight of an otherwise equivalent battery including a substantially metallic protective mechanism for mitigating or preventing the mechanical damage or the electrical damage.

According to yet another general embodiment, an electrochemical cell includes: an anode; a cathode; a porous separator that is either directly ionically coupled or indirectly ionically coupled to the anode and the cathode; and a plurality of precursors of a polymer support system present in an interior volume of the anode, an interior volume of the porous separator, an interior volume of the cathode. Importantly, the plurality of precursors of the polymer support system are arranged in one or more continuous pathways extending from the anode to the cathode.

According to still yet another general embodiment, a method for fabricating an electrochemical cell includes assembling a plurality of components of the electrochemical cell. Importantly, the plurality of components include: an anode; a cathode a porous separator either directly ionically coupled or indirectly ionically coupled to the anode and the cathode; and a continuous network of precursors of a polymer support system. The continuous network includes or is present in the form of a plurality of continuous pathways extending from the anode to the cathode, where at least some of the continuous pathways penetrate the anode, the porous separator, and the cathode.

Regardless of the particular physical configuration of the (optional) current collectors 102, 110, the polymeric network 116 is "continuous" in that a continuous path of covalently bonded polymer(s) extends the entire length between a given pair of current collectors 102, 110, or more preferably that a continuous path of covalently bonded polymer(s) extends the entire length of the electrochemical cell, i.e., an entire distance between the most distant current collectors 102, 110 present in the electrochemical cell. FIG. 1A illustrates a simplified schematic of an electrochemical cell 100 having a polymeric support system including a plurality of current collectors 102, 110 and a continuous polymeric network 116 extending throughout the interior volume of the electrochemical cell 100, according to one embodiment. The current collectors 102, 110 include anode current collectors 102 and cathode current collectors 110. Notably, the anode current collectors 102 and cathode current collectors 110 are configured to serve as anchors for the continuous polymeric network 116. According to the implementation shown in FIG. 1A, this configuration takes the form of a plurality of perforations 114 (white space) formed in the respective current collectors 102, 110. Additionally or alternatively, the current collector(s) 102 and/or 110 may comprise a mesh, an expanded metal, a porous material, etc. as would be understood by those having ordinary skill in the art upon reading the present disclosure.

Moreover, while the embodiment shown in FIG. 1A depicts the current collectors 102, 110 including the perforations, mesh, expanded metal, porous material, etc., it shall be understood that in various approaches other components of the electrochemical cell, including but not limited to the anode 104, porous separator 106, cathode active material 108, etc. may similarly be perforated, porous, comprise a mesh or an expanded metal, etc. to facilitate penetration thereof and/or physical coupling thereto by the continuous polymeric network 116, without departing from the scope of the inventive concepts described herein.

These perforations 114 (or equivalently pores, gaps in mesh or expanded metals, etc.) enable the continuous polymeric network 116 to be anchored to the current collectors 102, 110, preferably via covalent bonds with the current collectors 102, 110 or by surrounding or encasing portions of the current collectors 102, 110. In turn, the continuous polymeric network 116 and current collectors 102, 110 form a polymer support system that conveys tensile strength within the electrochemical cell in an amount sufficient to mitigate or prevent volumetric change within the electrochemical cell. For instance, in one approach the polymer support system conveys a tensile strength equivalent to about one atmosphere (atm) of external pressure.

In various implementations, the polymer support system is configured to convey a tensile strength in a range equivalent to from about 0.1 atm to about 5 atm. For instance, tensile strength conveyed by the polymer support system may be about 0.1 atm, about 0.25 atm, about 0.33 atm, about 0.5 atm, about 0.66 atm, about 0.75 atm, about 0.9 atm, about 0.95 atm, about 0.99 atm, about 1 atm, about 1.25 atm, about 1.33 atm, about 1.5 atm, about 1.66 atm, about 1.75 atm, about 2 atm, about 2.5 atm, about 3 atm, about 3.33 atm, about 4 atm, about 5 atm, or any value (or range of values) therebetween, without departing from the scope of the presently described inventive concepts.

As will be appreciated by those having ordinary skill in the art, providing mechanical strength, particularly compressive strength, tensile strength, etc. to the electrochemical cell 100 advantageously removes the need for a separate compressive structure, and reduces the overall weight and/or volume of the resulting battery. According to various embodiments, replacing the conventional metal-based compressive structure with a polymer support system as described herein may reduce overall weight of the battery in an amount ranging from about 5% of total weight to about 15% of total weight (relative to an otherwise identical battery including a metal-based compressive structure or equivalent thereof). For instance, overall weight reduction may be about 5 wt %, about 7.5 wt %, about 10 wt %, about 12.5 wt %, about 15 wt % or any value therebetween, without departing from the scope of the presently described inventive concepts. Similarly, overall reduction in volume of batteries implementing a polymer support system as presently disclosed may be in a range from about 5% to about 15%, such as a 5% reduction in volume, a 7.5% reduction in volume, a 10% reduction in volume, a 12.5% reduction in volume, a 15% reduction in volume, or any value therebetween, in accordance with the inventive concepts presented herein.

In use, the aforementioned reduced weight and volume advantageously allows for smaller batteries, which may be utilized in a broader range of applications than otherwise identical batteries employing a conventional compressive structure rather than the inventive polymer support system described herein. For instance, smaller batteries may be installed in different locations (e.g., away from sensitive components, human operators, etc.) in an apparatus using such batteries as a power source, improving safety of the apparatus in operation, allowing load balancing within the apparatus, etc. as would be appreciated by a person having ordinary skill in the art upon reading the present disclosure. In addition, apparatuses including a battery with reduced weight may operate more efficiently. For instance, using a reduced-weight battery in an electric or hybrid vehicle may extend the range (or equivalently, reduce fuel consumption) the vehicle may achieve on a given charge.

In addition to enabling reduction of overall weight and volume, a battery employing a polymer support system as described herein may facilitate improved operation of the electrochemical cell itself. For instance, providing a tensile strength, compressive strength, etc. equivalent to about one atmosphere or more improves the electrochemical conditions (e.g., interaction between electrolyte and electrode active material, suppression of dendrite formation,) within the cell while maintaining the native atmospheric pressure of the environment in which the battery is operating, i.e., without pressurizing said operating environment. For instance, according to one embodiment a battery including a polymeric support system as described herein may be used in environments characterized by an ambient pressure less than one atmosphere (e.g., a vacuum such as space) while maintaining mechanical integrity and providing favorable electrochemical conditions without adding weight associated with conventional compressive structures. This is particularly advantageous for aerospace and aviation applications, as the reduced weight allows for a greater payload to be carried along with the vehicle, satellite, etc., and reduces fuel or energy consumption of the vehicle, satellite, etc.

Further still, the polymer support system described herein may be engineered to tune certain properties, particularly thermal conductivity, ionic conductivity, and electrical conductivity, according to various implementations and as described in greater detail hereinbelow. Preferably, the polymer support system is not electrically conductive to avoid shorting the electrochemical cell. On the other hand, the polymer support network is ionically conductive, preferably conductive to ions of sulfur, lithium, and/or to polysulfides. Additionally, in various aspects the presently disclosed inventive concepts may utilize a polymer support system with high thermal conductivity.

Returning now to FIG. 1A, between each pair of current collectors 102, 110 are a plurality of layers including an anode active material layer 104, a porous separator 106, and a cathode active material layer 108. According to the embodiment depicted in FIG. 1A, the electrochemical cell 100 is characterized by a repeating (e.g., laminar) structure comprising a first unit u1 and a second unit u2. Each of the units u1, u2 is independently characterized by a layered structure including an anode current collector 102 adjacent to an anode active material layer 104, which in turn is adjacent to a porous separator 106, which in turn is adjacent to a cathode active material layer 108, which in turn is adjacent to a cathode current collector 110, which in turn is adjacent to a second cathode active material layer 108, which in turn is adjacent to a second porous separator 106, which in turn is adjacent to a second active anode material layer 104, which in turn is adjacent to a second anode current collector 102. By "adjacent", it shall be understood that the respective layers are electrically coupled, ionically coupled, or both electrically and ionically coupled. Such electrical and/or ionic coupling may be achieved by placing the various layers in contact with one another, or any other equivalent mechanism that would be appreciated by a person having ordinary skill in the art upon reading the present disclosure. While the electrochemical cell arrangements shown in FIGS. 1A-4 depict two repeating units u1 and u2, it shall be understood that according to various embodiments, electrochemical cells may include any number of repeating units each independently having a multi-layer structure as described above.

In some implementations, the electrochemical cell 100 may optionally omit the anode current collector(s) 102, the cathode current collector(s) 110, or both. According to such implementations, preferably the anode active material layer 104, the cathode active material layer 108, or both, respectively comprise one or more materials (such as lithium, carbon, copper, etc. as would be known by skilled artisans upon reading the present disclosure) that are suitable for conducting current from the anode or the cathode to an external environment of the battery, e.g., to one or more battery tabs configured to conduct electricity generated by the battery to another device electrically coupled thereto via said battery tab(s).

Moreover, in still more implementations, the porous separator 106 may be ionically coupled to the anode active material layer 104, the cathode active material layer 108, or both, either directly or indirectly.

As will be appreciated by skilled artisans upon reading the present disclosure, the porous separator 106 is directly electrically coupled, indirectly ionically coupled, or both, to a given electrode (104, 108) or active material layer thereof when the material of the at least portions of the porous separator 106 are in physical contact with the respective electrode, etc.

Similarly, the porous separator shall be understood as indirectly ionically coupled to the given electrode (104, 108) where a protective layer or cap is positioned between the respective electrode active material and the porous separator 106, and such protective layer or cap substantially does not interfere with operation of the electrochemical cell.

Moreover, it shall be understood that each of the various layers 102-110 comprises a material that can be penetrated by a polymer support system such as the continuous polymeric network 116 shown in FIG. 1A, allowing formation of the continuous path between current collectors 102, 110.

According to various embodiments of the presently described inventive concepts, the polymer support system may include myriad different components and exhibit a variety of features, physical characteristics, functionalities, etc. as described herein and as would be appreciated by a skilled artisan upon reading the instant disclosure.

Preferably, the polymer support system, at time of fabrication, is in liquid phase, and penetrates the pores, perforations, gaps, etc. of the current collectors 102, 110, and all layers of material therebetween. Suitable precursor materials, according to various approaches, may include polymer precursors (e.g., monomers, dimers, trimers, thermoplastics, etc.) crosslinkers, terminators, initiators, solvent systems, binders, carbonaceous materials, thermosetting materials, phase change materials, scavengers, etc. as would be appreciated by a person having ordinary skill in the art upon reading these descriptions.

As utilized herein, the terms "penetrating" and "interpenetrating" shall be understood as equivalent, and refer to a structural arrangement in which one component (e.g., a polymeric network, a network of polymeric precursors, monolithic structures, chemical anchors, etc. as described herein and equivalents thereof that would be appreciated by those having ordinary skill in the art upon reading the present disclosure) is physically coupled to another component (e.g., an anode, an anode current collector, a cathode, a cathode current collector, a porous separator, one or more external components such as casings, pouches, packs, modules, assemblies, trays, pans, etc. as described herein and equivalents thereof that would be appreciated by those having ordinary skill in the art upon reading the present disclosure). Moreover, the physical coupling involves one of the components (the "penetrating" or "interpenetrating" component) being at least partially present within an interior volume of the other component (the "penetrated" or "interpenetrated component").

In various implementations, the polymeric precursors may include precursors of thermoplastic olefin(s), thermoplastic polyolefin(s), olefinic thermoplastic elastomer-type structure(s), thermoplastic polymers, photopolymers, liquid crystal polymers, crosslinking polymers, acrylics, copolymers, hybridized crosslinking polymers, epoxies, silicones. It shall be appreciated that suitable compounds for use as polymeric precursors include amorphous compounds as well as semi-crystalline compounds, according to various embodiments.

More specifically, exemplary polymer precursors as described herein may include any combination or permutation of precursors of: polytrimethylene terephthalate, polyethersulfone, high density polyethylene, low density polyethylene, linear low density polyethylene, polypropylene, polyolefin copolymers, polystyrene, polystyrene copolymers, polythene, polyvinyl halides, polyvinyl alcohols, polytetrafluoroethylene (TEFLON(R)), polyacrylates, polymethacrylates, polyesters, polyvinylchloride, fluoropolymers, polyamides, polyamide-imides, polyether imides, polyphenylene sulfides, polysulfones, polyacetals, polycarbonates, polyphenylene oxides, polyurethanes, thermoplastic elastomers, epoxies, alkyds, melamines, phenolics, ureas, vinyl esters, etc.; epoxies, cyanate esters, polyurethanes, acrylonitric butadiene styrene (ABS) and polyacrylonitrile (PAN), ethylene vinyl alcohol, poly(methyl methacrylate) (PMMA), polyvinyl cinnamate, polyisoprene, polyamides, polyimides, styrenic block copolymers, bitumen, nitrile rubber, polycarbonate, polyetherimide (PEI), poly(pheylene sulfide) (PPS), polyetheretherketone (PEEK), polyetherketones (PEK), polyetherketoneketone (PEKK), polyaryletherketone (PAEK), polylactic acid (PLA), polybenzimidazole (PBI), polyetherimide (PEI), polyethersulfone (PES), polyphenylene sulfide (PPS), polyphthalamide (PPA), polyamides (6, 11, 6.6, 12, etc.) (Pas), etc. as would be appreciated by a person having ordinary skill in the art upon reading the present disclosure.

In more embodiments, suitable polymer precursors include precursors of acrylic resins, e.g., precursors including an acrylic group that can be polymerized via radicals, such as acrylic polyols, aliphatic polyisocyanates, urethane acrylates, etc. as would be understood by a person having ordinary skill in the art upon reading the present disclosures, as well as combinations and equivalents thereof, without limitation unless otherwise expressly stated herein.

In still more embodiments, suitable polymer precursors include precursors of epoxy resins, e.g., compounds capable of undergoing cationic polyermization optionally using a cationic photoinitiator or other suitable equivalent mechanism, as would be appreciated by persons having ordinary skill in the art upon reading the present disclosure. For example, suitable epoxy resin precursors may include diaxonimum salt(s), diaryliodionium salt(s), triarylsulfonium salt(s), alkylsulfonium salt(s), iron arene salt(s), sulfolyloxyketone(s), triarylsiloxysiloxane(s), etc., as well as equivalents or combinations thereof, without limitation unless otherwise expressly stated herein.

In still yet more embodiments, suitable polymer precursors may include precursors of vinyl compounds, preferably capable of radical polymerization, such as vinyl halide(s), vinyl alcohol(s), acrylamide(s), etc. as would be known by a skilled artisan upon reading the present disclosure, as well as equivalents or combinations thereof, without limitation unless otherwise expressly stated herein.

As utilized herein, the term "polymer precursor" or "polymeric precursor" shall be understood as referring to any material capable of participating in a polymerization reaction under appropriate chemical, environmental, energetic, etc. conditions in order to form a polymer or polymers comprising one or more repeating chains of the polymer precursor (optionally with slight modification to allow covalent bonds to form between the individual units of the polymer during polymerization thereof).

In more embodiments, the polymer precursors may include precursors of "scavenging" materials, where "scavenging" materials are understood to capture and occupy, or even convert, a given compound or compounds present within an electrochemical cell. One exemplary polysulfide scavenging material is polypropylene. Other exemplary scavenging materials include polyols, phenolic antioxidants, n-octyltriethoxysilane, n-propyltriethoxysilane, or any suitable equivalent(s) or combination(s) thereof, as would be appreciated by those having ordinary skill in the art upon reviewing the inventive concepts described herein.

Further exemplary scavenging materials include, without limitation, trimethylsilyl)isothiocyanate (TMSNCS), aminosilan-based compounds, copper-containing compounds, zinc-containing compounds, iron-containing compounds, etc. as would be appreciated by persons having ordinary skill in the art upon reading the present disclosure, as well as equivalents and/or combinations thereof, without limitation unless otherwise expressly stated herein. The foregoing exemplary scavenging materials are particularly useful for scavenging unbound sulfur.

In still more embodiments, exemplary water scavenging materials include polyacrylates, volcanic ash, talc, mica, alumina, silica, cellulose-based materials, and any suitable equivalent(s) or combination(s) thereof, as would be understood by skilled artisans reading the descriptions provided herein, and without limitation unless otherwise expressly stated herein.

Examples of suitable oxygen-scavenging materials include, without limitation, metallic reducing agents (e.g., powderized iron oxide, ferrous carbonates, metallic platinum, metal halides, etc. as would be understood by a skilled artisan upon reading the instant disclosure, as well as non-metallic species, such as ascorbic acid, particularly in combination with sodium bicarbonate, etc. as well as any suitable combination or equivalent of the foregoing metallic and/or non-metallic compounds.

In still more embodiments, instead of or in addition to the aforementioned polymer precursors, the exemplary polymer support system may include partially and/or fully polymerized polymer components. According to such embodiments, curing of the polymer support system may involve activating initiators, inducing crosslinking between or among polymer and/or polymeric precursor components, thermal curing, chemical curing, optical curing, kinetic curing, etc. as would be understood by a person having ordinary skill in the art upon reading the present disclosure.

Suitable crosslinkers, according to various implementations, may include amine-based chemicals, polycarbamides, [polyurea], polyamides, dicyandiamide, cycloalpahtic amines, boron trifluoride, amidoamines, aliphatic amines, tetraglycidyldiaminodiphenylmethane, diethyltoluene diamine, aromatic amine curing agents, or any combination or equivalent(s) thereof that would be appreciated by a person having ordinary skill in the art upon reading the present disclosure.

Suitable terminators, according to various implementations, may include any compound known by those having ordinary skill in the art as being suitable for terminating, or substantially reducing the rate of an ongoing polymerization reaction, such as compounds capable of inducing ionic changes within a solution (e.g., via introduction of a counterion into an anionic pair), compounds capable of modifying activation energy of the polymerization reaction, such as amine-based compounds including triamine hybrids with biamine groups, etc. Of course, suitable equivalents or combinations of the foregoing exemplary terminators may be employed without departing from the scope of the present disclosure, without limitation unless otherwise expressly stated herein.

Suitable initiators, according to various implementations, may include electromagnetic radiation (particularly ultraviolet light, X-ray radiation, gamma radiation, etc.) compounds capable of generating radicals, moisture-based initiators, exothermic initiators, endothermic initiators, latent heat within the electrochemical cell, heat generated during cycling of the electrochemical cell, catalysts, or any combination or equivalent(s) thereof that would be appreciated by a person having ordinary skill in the art upon reading the present disclosure.

Suitable solvent systems, according to various implementations, may include solvent(s) such as dimethyl siloxane (DMSO), tetrabutylammonium hydroxide (TBA) and/or dimethyl formamide (DMF). And/or diluent(s) including non-reactive diluents such as 1,2-dimethoxyethane (DME), tetrahydrofuran (THF), triethylene glycol dimethyl ether (TEGDME), 2-methyl-2-oxazoline (MOZ) and/or reactive diluents such as 1,3-Dioxolane (DOL), 3,3-dimethyloxetane (DMO), 2-ethyl-2-oxazoline (EOZ), e-caprolactone (CL), or any combination or equivalent(s) of solvent(s), non-reactive diluents, and/or reactive diluent(s) that would be appreciated by a person having ordinary skill in the art upon reading the present disclosure.

Suitable binders, according to various implementations, may include polyacrylate, polyacrylamide (PAM), cyanoacrylates (such as methyl-2-cyanoacrylate (MCA), ethyl 2-cyanoacrylate (ECA)), aliphatic amines, polyamides, amidoamines, cyclophatic amines, aromatic amines, vinyltrimethoxysilane, or any combination or equivalent(s) thereof that would be appreciated by a person having ordinary skill in the art upon reading the present disclosure.

Suitable carbonaceous materials, according to various implementations, may include any combination or permutation of: carbon black, graphite, pyrolytic graphite, graphene (preferably three-dimensional graphene (3DG), graphene nanoparticles, and/or graphene platelets), single-walled carbon nanotubes (SWCNT), multi-walled carbon nanotubes (MWCNT), carbon nanotubes, carbon nano-onions (CNOs), necked CNOs, carbon nanospheres, fullerenes, hybrid fullerenes, or any combination or equivalent(s) thereof that a skilled artisan would appreciate as suitable once informed of the presently described inventive concepts. Preferably, the carbonaceous materials included in the precursor materials are present in the form of discontinuous fibers. In some approaches, the carbonaceous materials may be mixed, embedded, dispersed, etc. with polymer precursor to that the carbonaceous material is substantially uniformly distributed throughout the bulk of the resulting polymer (i.e., after curing).

Suitable thermosetting systems, according to various implementations, may include epoxies, phenocarboxylic acids (phenolic), bismaleimides, cyanates, esters, polybenzoxazines, crosslinking polymers (such as BIS-A polymers, BIS-F polymers, epoxies, hybridized polymers, cyanate esters, polyurethanes, etc.), photopolymers (such as acrylics, vinyl compounds such as polyvinyl alcohol, polyvinyl cinnamate, etc. polyisoprenes, polyamides, epoxies, polyimides, styrenic block copolymers, nitrile rubber, etc.), carbon fibers (optionally reinforced, e.g., with graphene), or any suitable equivalent or combination thereof as would be appreciated by a person having ordinary skill in the art upon reading the present descriptions. For instance, in one approach a suitable combined thermosetting system may include a thermoplastic such as PEEK disposed in a cyanate ester with graphene-reinforced carbon fibers and/or laced butadiene particles dispersed throughout.

It shall be understood that in the context of the presently disclosed inventive concepts, "phase change" may refer to conventionally understood phase changes, such as from liquid to solid (freezing), solid to liquid (melting), liquid to gas (boiling or evaporation), gas to liquid (condensation), solid to gas (sublimation), etc. as known in the art. "Phase change" shall also be understood as referring to other types of change, such as solid-solid changes from one crystalline structure or organization to another crystalline structure or organization (e.g., from orthorhombic to monoclinic), particularly solid-solid changes where the change results from heat induction). "Phase change" shall be understood to still further include liquid-liquid changes (e.g. hygroscopic materials that utilize evaporation/condensation cycles), or any combination or equivalent(s) thereof, without departing from the scope of the presently described inventive concepts. Suitable phase change materials, according to various implementations, may include organic materials, inorganic materials, paraffin waxes, non-paraffin organics, hydrated salts, metallics, or any suitable combination or equivalent(s) thereof that would be appreciated by a person having ordinary skill in the art upon reading the present disclosure.

According to several different mechanisms and/or processes described herein, these precursors may be "cured" (or, equivalently, may undergo a polymerization reaction or process) using chemical means, optical (electromagnetic) means, kinetic means, thermal means, or any other suitable equivalent thereof that would be appreciated by a person having ordinary skill in the art upon reading the instant disclosure. It will be further understood that the particular curing mechanism or process employed may convey unique advantages on the resulting electrochemical cell.

Figure 1B:
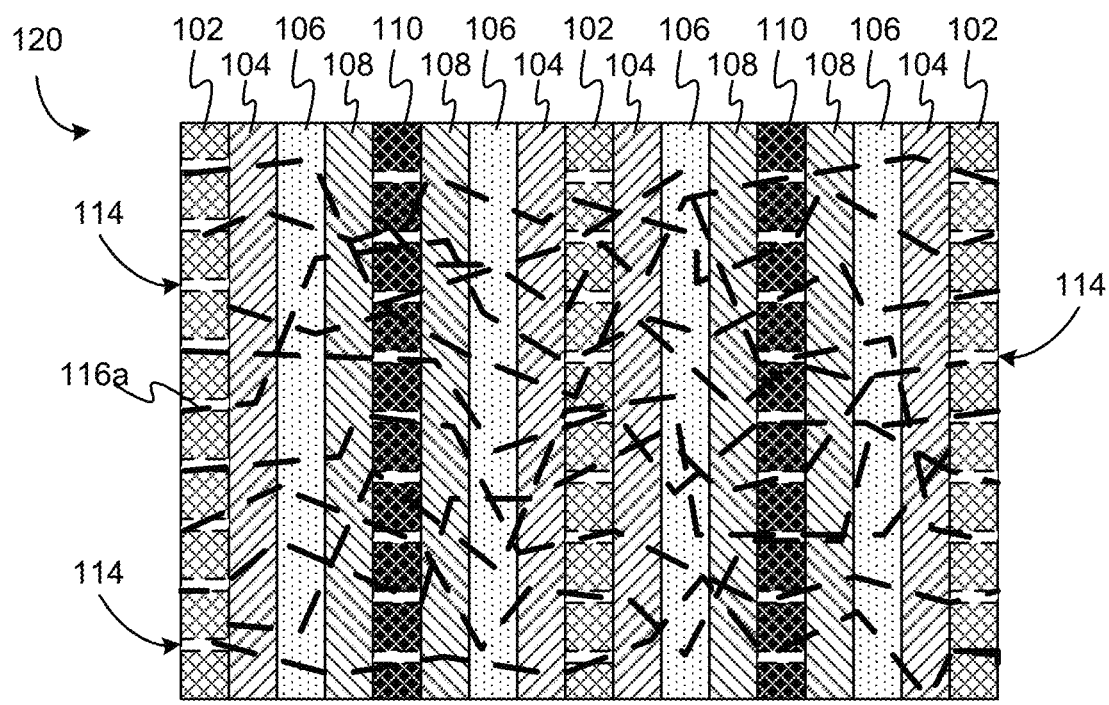
FIG. 1B illustrates a simplified schematic of an electrochemical cell having perforated current collectors and a continuous network of polymeric precursors extending throughout the interior volume of the electrochemical cell, according to one embodiment.

FIG. 1B depicts a simplified schematic of an electrochemical cell 120 that may include any combination of features described hereinabove with respect to electrochemical cell 100 shown in FIG. 1A, with the exception that instead of a fully formed (i.e., cured) continuous polymer network 116, the electrochemical cell 120 includes a continuous network of polymeric precursors 116a, which may include any combination of exemplary compounds described hereinabove. Preferably, the continuous network of polymeric precursors 116a extends throughout the interior volume of the electrochemical cell 120, and penetrates some or all of the components such as the anode current collector 102, anode active material 104, porous separator 106, cathode active material 108, cathode current collector 110, or any combination or permutation thereof. More preferably, the continuous network of polymeric precursors 116a includes suitable compounds for curing to be initiated under appropriate conditions (e.g., thermal, kinetic, optical, chemical, etc.) and at a desired point in time. For instance, the continuous network of polymeric precursors 116a may be configured to undergo curing during a first cycle, or first few (e.g., about five) cycles of operation of the electrochemical cell. Regardless of the particular mechanism or timing of such curing, upon completion thereof the electrochemical cell 120 shown in FIG. 1B may exhibit substantially all the same characteristics of any embodiment of the electrochemical cell 100 as shown in FIG. 1A, as would be appreciated by those having ordinary skill in the art upon reading the present disclosure.

Figure 1C:
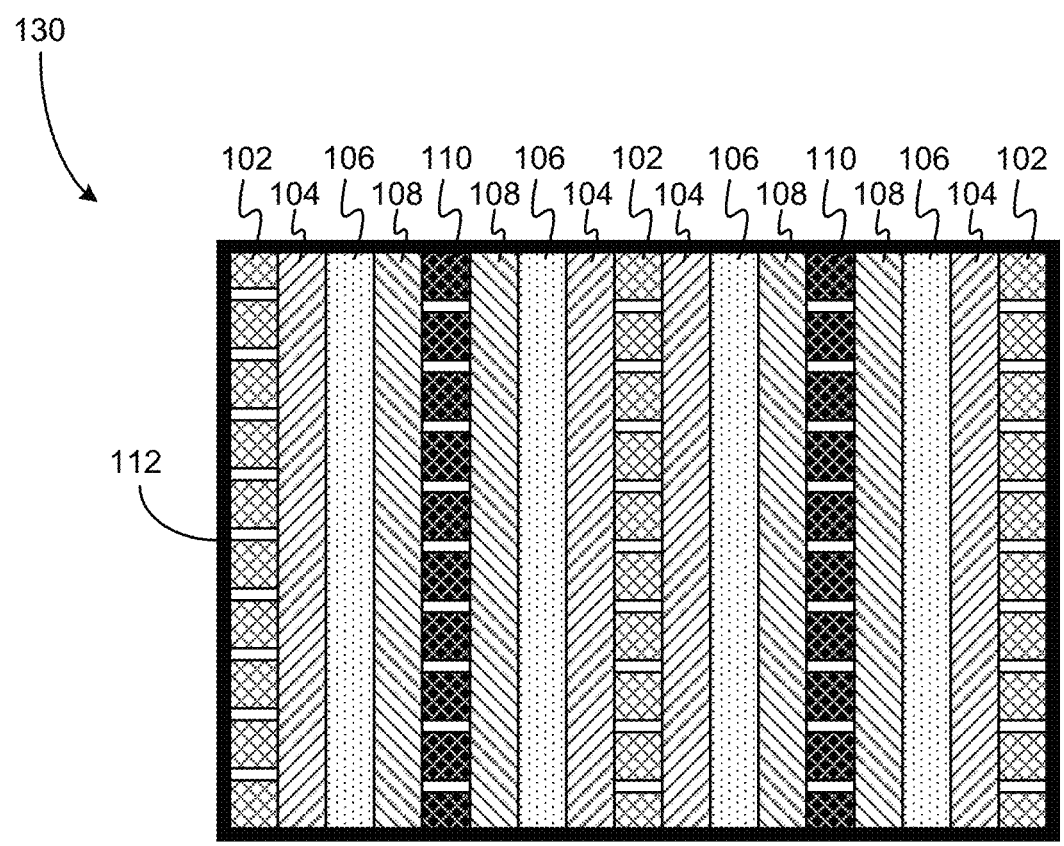
FIG. 1C illustrates a simplified schematic of an electrochemical cell having a polymeric support system including a casing surrounding an exterior of the electrochemical cell, according to one embodiment.

FIG. 1C illustrates a simplified schematic of an electrochemical cell 130 having a polymeric support structure 112 surrounding an exterior of the electrochemical cell 120, according to one embodiment. Advantageously, the polymeric support structure 112 may replace or obviate the need for a conventional compressive structure, reducing the total weight, without sacrificing mechanical strength of the electrochemical cell 120 and batteries including such electrochemical cells. As described in greater detail hereinbelow, the use of a polymeric support structure 112 and/or continuous polymer network 116 improves performance of apparatuses utilizing batteries with such a polymeric support structure 112 and/or continuous polymer network 116 in lieu of conventional, metal-based compressive structures.

As understood herein, a continuous polymer network comprises one or more polymeric "bridges", where each bridge is chemically connected, via covalent bonding between adjacent units of the bridge, throughout a continuous path extending from the anode current collector to the cathode current collector of an electrochemical cell. According to select embodiments, bridges may optionally be covalently bonded to one another, e.g., via crosslinking. Additionally or alternatively, bridges maybe chemically connected along a continuous path extending through multiple anode and/or cathode current collectors, as is the case for continuous polymer network 116 as shown in FIG. 1.

According to select approaches, a polymeric support structure 112 surrounding an electrochemical cell may replace conventional "can" components conventionally used to provide mechanical (particularly compressive) support to the encompassed electrochemical cell. Preferably, such polymeric support structures 112 exhibit mechanical properties suitable for providing support while allowing a certain margin of flexibility to accommodate small volumetric changes over the operational lifetime of the electrochemical cell, while also protecting the electrochemical cell from other sources of mechanical failure such as puncturing.

Desirable mechanical properties, according to one approach, include the polymeric support structure 112 exhibiting a density in a range from about 0.1 g/cm$^3$ to about 10 g/cm$^3$, such as a density of about 0.1 g/cm$^3$, a density of about 0.25 g/cm$^3$, a density of about 0.33 g/cm$^3$, a density of about 0.5 g/cm$^3$, a density of about 0.66 g/cm$^3$, a density of about 0.75 g/cm$^3$, a density of about 0.9 g/cm$^3$, a density of about 1.0 g/cm$^3$, a density of about 1.25 g/cm$^3$, a density of about 1.33 g/cm$^3$, a density of about 1.5 g/cm$^3$, a density of about 1.66 g/cm$^3$, a density of about 1.75 g/cm$^3$, a density of about 1.9 g/cm$^3$, a density of about 1.99 g/cm$^3$, a density of about 2.0 g/cm$^3$, a density of about 2.25 g/cm$^3$, a density of about 2.33 g/cm$^3$, a density of about 2.5 g/cm$^3$, a density of about 2.75 g/cm$^3$, a density of about 3.0 g/cm$^3$, a density of about 3.33 g/cm$^3$, a density of about 3.5 g/cm$^3$, a density of about 3.75 g/cm$^3$, a density of about 4.0 g/cm$^3$, a density of about 5.0 g/cm$^3$, a density of about 6.0 g/cm$^3$, a density of about 7.5 g/cm$^3$, a density of about 8 g/cm$^3$, a density of about 9 g/cm$^3$, a density of about 10.0 g/cm$^3$, or any value or range of values from about 1.0 g/cm$^3$ to about 10.0 g/cm$^3$, whether including the foregoing exemplary values as endpoints or including endpoints other than those expressly stated above but within the broad range from about 1.0 g/cm$^3$ to about 10.0 g/cm$^3$. According to preferred approaches, the density of the polymeric support structure 112 is in a range from about 1.0 g/cm$^3$ to about 2.0 g/cm$^3$.

Additional desirable properties include the polymeric support structure 112 exhibiting a thermal conductivity in a range from about 10 W/mk to about 75 W/mk, such as a thermal conductivity of about 10 W/mk, a thermal conductivity of about 15 W/mk, a thermal conductivity of about 20 W/mk, a thermal conductivity of about 25 W/mk, a thermal conductivity of about 33 W/mk, a thermal conductivity of about 40 W/mk, a thermal conductivity of about 50 W/mk, a thermal conductivity of about 60 W/mk, a thermal conductivity of about 70 W/mk, a thermal conductivity of about 75 W/mk, or any value or range of values from about 10 W/mk to about 75 W/mk, whether including the foregoing exemplary values as endpoints or including endpoints other than those expressly stated above but within the broad range from about 10 W/mk to about 75 W/mk, according to various aspects of the presently described inventive concepts. According to preferred approaches, the thermal conductivity of the polymeric support structure 112 is in a range from about 15 W/mk to about 60 W/mk.

Further desired properties may include the polymeric support structure 112 having effectively no electrical conductivity, to prevent unwanted short circuiting within the electrochemical cell. For instance, effectively no electrical conductivity may be understood herein as an electrical conductivity in a range from 0.0 S/m to about 50 S/m, such as an electrical conductivity of about 0.0 S/m, an electrical conductivity of about 0.25 S/m, an electrical conductivity of about 0.33 S/m, an electrical conductivity of about 0.5 S/m, an electrical conductivity of about 0.66 S/m, an electrical conductivity of about 0.75 S/m, an electrical conductivity of about 0.9 S/m, an electrical conductivity of about 1.0 S/m, an electrical conductivity of about 2.5 S/m, an electrical conductivity of about 5.0 S/m, an electrical conductivity of about 10.0 S/m, an electrical conductivity of about 20.0 S/m, an electrical conductivity of about 25.0 S/m, an electrical conductivity of about 33.0 S/m, an electrical conductivity of about 40.0 S/m, an electrical conductivity of about 50.0 S/m, an electrical conductivity of about 66.0 S/m, an electrical conductivity of about 70.0 S/m, an electrical conductivity of about 75.0 S/m, or any value or range of values from about 0.0 S/m to about 75 S/m, whether including the foregoing exemplary values as endpoints or including endpoints other than those expressly stated above but within the broad range from about 0.0 S/m to about 75 S/m. According to preferred approaches, the electrical conductivity of the polymeric support structure 112 is in a range from about 0.0 S/m to about 50 S/m, and in particularly preferred approaches the electrical conductivity of the polymeric support structure 112 is about 0.0 S/m.

Further desired properties may include the polymeric support structure 112 having a modulus of elasticity sufficient to provide flexibility to the polymeric support structure 112 and the electrochemical cell. For instance, sufficient modulus of elasticity may be understood herein as being in a range from 100 ksi to about 750 ksi, such as a modulus of elasticity of about 100 ksi, a modulus of elasticity of about 150 ksi, a modulus of elasticity of about 175 ksi, a modulus of elasticity of about 200 ksi, a modulus of elasticity of about 250 ksi, a modulus of elasticity of about 300 ksi, a modulus of elasticity of about 350 ksi, a modulus of elasticity of about 400 ksi, a modulus of elasticity of about 500 ksi, a modulus of elasticity of about 600 ksi, a modulus of elasticity of about 750 ksi, or any value or range of values from about 100 ksi to about 750 ksi, whether including the foregoing exemplary values as endpoints or including endpoints other than those expressly stated above but within the broad range from about 100 ksi to about 750 ksi. According to preferred approaches, the modulus of elasticity of the polymeric support structure 112 is about 350 ksi.

Still further desired properties for the polymeric support structure 112 may include a tensile strength of at least about 10 MPa, such as a tensile strength of at least about 15 MPa, a tensile strength of at least about 25 MPa, a tensile strength of at least about 33 MPa, a tensile strength of at least about 50 MPa, a tensile strength of at least about 66 MPa, a tensile strength of at least about 75 MPa, a tensile strength of at least about 80 MPa, a tensile strength of at least about 90 MPa, a tensile strength of at least about 100 MPa, a tensile strength of at least about 150 MPa, a tensile strength of at least about 200 MPa, a tensile strength of at least about 300 MPa, a tensile strength of at least about 400 MPa, a tensile strength of at least about 500 MPa, or more. According to various implementations, the tensile strength of the polymeric support structure 112 may be any value or range of values from about 10 MPa to about 500 MPa, whether including the foregoing exemplary values as endpoints or including endpoints other than those expressly stated above but within the broad range from about 10 MPa to about 500 MPa. According to preferred approaches, the modulus of elasticity of the polymeric support structure 112 is at least about 50 MPa.

Yet still further desired properties for the polymeric support structure 112 preferably include an elongation at yield of greater than about 1%. For instance, according to various approaches, the elongation at yield of the polymeric support may about 1% or more, about 2% or more, about 3% or more, about 4% or more, about 5% or more, about 6.66% or more, about 7.5% or more, about 10% or more, about 12.5% or more, about 15% or more, about 20% or more, about 25% or more, or about 33% or more. According to various implementations, the elongation at yield of the polymeric support structure 112 may be any value or range of values from about 1% to about 33%, whether including the foregoing exemplary values as endpoints or including endpoints other than those expressly stated above but within the broad range from about 1% to about 33%. According to preferred approaches, the modulus of elasticity of the polymeric support structure 112 is at least about 4%.

Those having ordinary skill in the art will appreciate that the foregoing measures and values of mechanical strength may be present in any suitable combination, and may be applicable to either or both of the continuous polymer network 116 and the various polymeric support structures 112-112d shown in the Figures and described herein, or any other component or portion of the overall polymer support system, without departing from the scope of the presently disclosed inventive concepts.

Moreover, in addition to the desirable mechanical properties described above, in particularly preferred embodiments, the polymeric support structure 112 and (even more preferably) the continuous polymer network comprise material(s) or compound(s) that are permeable to lithium sulfides, including but not limited to $LiS_2$, $LiS_4$, $LiS_6$, $LiS_8$, or any other species of lithium sulfide that may be present in an exemplary lithium sulfide electrochemical cell, as would be understood by those having ordinary skill in the art upon reading the present disclosure. Most preferably, the polymeric support structure 112 and (even more preferably) the continuous polymer network 116 comprise material(s) or compound(s) that actively facilitate transport of lithium sulfides, i.e., compounds that are ionically conductive with respect to lithium sulfides.

According to myriad implementations, exemplary materials and compounds that exhibit permeability and/or ionic conductivity to lithium sulfides and which are suitable for use in the context of the presently disclosed inventive concepts include, without limitation, electrolyte(s).

For example, in one implementation, the electrolyte is formulated from a 0.4 molar (M) solution of lithium bis(trifluoromethanesulfonyl)imide (LiTFSI) formed from approximately 114.83 grams of powdered LiTFSI dissolved in 1 liter of a liquid solvent mixture having a 58:28:13 volume ratio of dimethoxyethane (DME), 1,3-dioxolane (DOL), and tetra ethylene glycol dimethyl ether (TEGDME). An additive including 26 grams of lithium nitrate ($LiNO_3$) is added to the 0.4 molar (M) solution of LiTFSI to achieve a dilution level of 2 percent by weight of lithium nitrate ($LiNO_3$).

In another implementation, the electrolyte is formulated from a 0.4 molar (M) solution of lithium bis(trifluoromethanesulfonyl)imide (LiTFSI) formed from approximately 114.83 grams of powdered LiTFSI dissolved in 1 liter of a liquid solvent mixture having a 50:25:25 volume ratio of dimethoxyethane (DME), 1,3-dioxolane (DOL), and tetrahydrofuran (THF). An additive including 26 grams of lithium nitrate ($LiNO_3$) is added to the 0.4 molar (M) solution of LiTFSI to achieve a dilution level of 2 percent by weight of lithium nitrate ($LiNO_3$).

In another implementation, the electrolyte is formulated from a 0.4 molar (M) solution of lithium bis(trifluoromethanesulfonyl)imide (LiTFSI) formed from approximately 114.83 grams of powdered LiTFSI dissolved in 1 liter of a liquid solvent mixture having a 50:25:25 volume ratio of dimethoxyethane (DME), 1,3-dioxolane (DOL), and dimethyl sulfoxide (DMSO). An additive including 26 grams of lithium nitrate ($LiNO_3$) is added to the 0.4 molar (M) solution of LiTFSI to achieve a dilution level of 2 percent by weight of lithium nitrate ($LiNO_3$).

In another implementation, the electrolyte is formulated from a 0.4 molar (M) solution of lithium bis(trifluoromethanesulfonyl)imide (LiTFSI) formed from approximately 114.83 grams of powdered LiTFSI dissolved in 1 liter of a liquid solvent mixture having a 50:25:25 volume ratio of dimethoxyethane (DME), 1,3-dioxolane (DOL), and tetramethyl urea (TMU). An additive including 26 grams of lithium nitrate ($LiNO_3$) is added to the 0.4 molar (M) solution of LiTFSI to achieve a dilution level of 2 percent by weight of lithium nitrate ($LiNO_3$).

In another implementation, the electrolyte is formulated from a 0.4 molar (M) solution of lithium bis(trifluoromethanesulfonyl)imide (LiTFSI) formed from approximately 114.83 grams of powdered LiTFSI dissolved in 1 liter of a liquid solvent mixture having a 50:25:25 volume ratio of dimethoxyethane (DME), 1,3-dioxolane (DOL), and toluene. An additive including 26 grams of lithium nitrate ($LiNO_3$) is added to the 0.4 molar (M) solution of LiTFSI to achieve a dilution level of 2 percent by weight of lithium nitrate ($LiNO_3$).

In another implementation, the electrolyte is formulated from a 0.4 molar (M) solution of lithium bis(trifluoromethanesulfonyl)imide (LiTFSI) formed from approximately 114.83 grams of powdered LiTFSI dissolved in 1 liter of a liquid solvent mixture having a 50:25:25 volume ratio of dimethoxyethane (DME), 1,3-dioxolane (DOL), and dimethyl formamide (DMF). An additive including 26 grams of lithium nitrate (LiNO$_3$) is added to the 0.4 molar (M) solution of LiTFSI to achieve a dilution level of 2 percent by weight of lithium nitrate (LiNO$_3$).

In another implementation, the electrolyte is formulated from a 0.4 molar (M) solution of lithium bis(trifluoromethanesulfonyl)imide (LiTFSI) formed from approximately 114.83 grams of powdered LiTFSI dissolved in 1 liter of a liquid solvent mixture having a 50:25:25 volume ratio of dimethoxyethane (DME), 1,3-dioxolane (DOL), and methoxyperfluorobutane (MPB). An additive including 26 grams of lithium nitrate (LiNO$_3$) is added to the 0.4 molar (M) solution of LiTFSI to achieve a dilution level of 2 percent by weight of lithium nitrate (LiNO$_3$).

In another implementation, the electrolyte is formulated from a 0.4 molar (M) solution of lithium bis(trifluoromethanesulfonyl)imide (LiTFSI) formed from approximately 114.83 grams of powdered LiTFSI dissolved in 1 liter of a liquid solvent mixture having a 50:25:25 volume ratio of dimethoxyethane (DME), 1,3-dioxolane (DOL), and trifluoroethyl ether (TFE). An additive including 26 grams of lithium nitrate (LiNO$_3$) is added to the 0.4 molar (M) solution of LiTFSI to achieve a dilution level of 2 percent by weight of lithium nitrate (LiNO$_3$).

In another implementation, the electrolyte is formulated from a 0.4 molar (M) solution of lithium bis(trifluoromethanesulfonyl)imide (LiTFSI) formed from approximately 114.83 grams of powdered LiTFSI dissolved in 1 liter of a liquid solvent mixture having a 50:25:25 volume ratio of dimethoxyethane (DME), 1,3-dioxolane (DOL), and triethylene glycol dimethyl ether (TrigDME). An additive including 26 grams of lithium nitrate (LiNO$_3$) is added to the 0.4 molar (M) solution of LiTFSI to achieve a dilution level of 2 percent by weight of lithium nitrate (LiNO$_3$).

In another implementation, the electrolyte is formulated from a 0.4 molar (M) solution of lithium bis(trifluoromethanesulfonyl)imide (LiTFSI) formed from approximately 114.83 grams of powdered LiTFSI dissolved in 1 liter of a liquid solvent mixture having a 50:25:25 volume ratio of dimethoxyethane (DME), 1,3-dioxolane (DOL), and methyl tert-butyl ether (MTBE). An additive including 26 grams of lithium nitrate (LiNO$_3$) is added to the 0.4 molar (M) solution of LiTFSI to achieve a dilution level of 2 percent by weight of lithium nitrate (LiNO$_3$).

In another implementation, the electrolyte is formulated from a 0.4 molar (M) solution of lithium bis(trifluoromethanesulfonyl)imide (LiTFSI) formed from approximately 114.83 grams of powdered LiTFSI dissolved in 1 liter of a liquid solvent mixture having a 50:25:25 volume ratio of dimethoxyethane (DME), 1,3-dioxolane (DOL), and dimethyl trisulfide (DMTS). An additive including 26 grams of lithium nitrate (LiNO$_3$) is added to the 0.4 molar (M) solution of LiTFSI to achieve a dilution level of 2 percent by weight of lithium nitrate (LiNO$_3$).

In another implementation, the electrolyte is formulated from a 0.4 molar (M) solution of lithium bis(trifluoromethanesulfonyl)imide (LiTFSI) formed from approximately 114.83 grams of powdered LiTFSI dissolved in 1 liter of a liquid solvent mixture having a 50:25:25 volume ratio of dimethoxyethane (DME), 1,3-dioxolane (DOL), and acetonitrile (ACN). An additive including 26 grams of lithium nitrate (LiNO$_3$) added to the 0.4 molar (M) solution of LiTFSI to achieve a dilution level of 2 percent by weight of lithium nitrate (LiNO$_3$).

In another implementation, the electrolyte is formulated from a 0.4 molar (M) solution of lithium bis(trifluoromethanesulfonyl)imide (LiTFSI) formed from approximately 114.83 grams of powdered LiTFSI dissolved in 1 liter of a liquid solvent mixture having a 50:25:25 volume ratio of dimethoxyethane (DME), 1,3-dioxolane (DOL), and 1,1,2,2-tetrafluoro-1-1(2,2,2-trifluoroethoxy)ethane (TFETFE). An additive including 26 grams of lithium nitrate (LiNO$_3$) is added to the 0.4 molar (M) solution of LiTFSI to achieve a dilution level of 2 percent by weight of lithium nitrate (LiNO$_3$).

In another implementation, the electrolyte is formulated from a 0.4 molar (M) solution of lithium bis(trifluoromethanesulfonyl)imide (LiTFSI) formed from approximately 114.83 grams of powdered LiTFSI dissolved in 1 liter of a liquid solvent mixture having a 50:25:25 volume ratio of dimethoxyethane (DME), 1,3-dioxolane (DOL), and 1,1,2,2-tetrafluoroethyl 2,2,3,3-tetrafluoropropyl ether (TTE). An additive including 26 grams of lithium nitrate (LiNO$_3$) is added to the 0.4 molar (M) solution of LiTFSI to achieve a dilution level of 2 percent by weight of lithium nitrate (LiNO$_3$).

In another implementation, the electrolyte is formulated from a 0.4 molar (M) solution of lithium bis(trifluoromethanesulfonyl)imide (LiTFSI) formed from approximately 114.83 grams of powdered LiTFSI dissolved in 1 liter of a liquid solvent mixture having a 50:25:25 volume ratio of dimethoxyethane (DME), 1,3-dioxolane (DOL), and 2-Methyltetrahydrofuran (MeTHF). An additive including 26 grams of lithium nitrate (LiNO$_3$) is added to the 0.4 molar (M) solution of LiTFSI to achieve a dilution level of 2 percent by weight of lithium nitrate (LiNO$_3$).

In another implementation, the electrolyte is formulated from a 0.4 molar (M) solution of lithium bis(trifluoromethanesulfonyl)imide (LiTFSI) formed from approximately 114.83 grams of powdered LiTFSI dissolved in 1 liter of a liquid solvent mixture having a 50:25:25 volume ratio of dimethoxyethane (DME), 1,3-dioxolane (DOL), and bis(2-methoxyethyl) (DEGDME). An additive including 26 grams of lithium nitrate (LiNO$_3$) is added to the 0.4 molar (M) solution of LiTFSI to achieve a dilution level of 2 percent by weight of lithium nitrate (LiNO$_3$).

In another implementation, the electrolyte is formulated from a 0.1 molar (M) solution of lithium bis(trifluoromethanesulfonyl)imide (LiTFSI) formed from approximately 114.83 grams of powdered LiTFSI dissolved in 1 liter of a liquid solvent mixture having a 95:5 volume ratio of dimethoxyethane (DME), and 1,3-dioxolane (DOL). No additive is added.

In another implementation, the electrolyte is formulated from a 0.1 molar (M) solution of lithium bis(trifluoromethanesulfonyl)imide (LiTFSI) formed from approximately 114.83 grams of powdered LiTFSI dissolved in 1 liter of a liquid solvent mixture having a 95:5 volume ratio of dimethoxyethane (DME), and 1,3-dioxolane (DOL). An additive including 26 grams of lithium nitrate (LiNO$_3$) is added to the 0.4 molar (M) solution of LiTFSI to achieve a dilution level of 2 percent by weight of lithium nitrate (LiNO$_3$).

In another implementation, the electrolyte is formulated from a 0.4 molar (M) solution of lithium bis(trifluoromethanesulfonyl)imide (LiTFSI) formed from approximately 114.83 grams of powdered LiTFSI dissolved in 1 liter of a liquid solvent mixture having a 50:25:25 volume ratio of dimethoxyethane (DME), 1,3-dioxolane (DOL), and tetra ethylene glycol dimethyl ether (TEGDME). An additive including 26 grams of lithium nitrate (LiNO$_3$) is added to the 0.4 molar (M) solution of LiTFSI to achieve a dilution level of 2 percent by weight of lithium nitrate (LiNO$_3$).

In more approaches, compounds that exhibit permeability and/or ionic conductivity to lithium sulfides may be or include polymeric chains. For instance, in one implementation, a first polymeric chain may be formed from a first plurality of interconnected monomer units, and a second polymeric chain may be formed from a second plurality of interconnected monomer units. In some aspects, the first plurality of interconnected monomer units, and the second plurality of interconnected monomer units, may be identical. In other aspects, the first plurality of interconnected monomer units, and the second plurality of interconnected monomer units, may be distinct from each other.

In some aspects, the first polymeric chain and the second polymeric chain may cross-link with each other based on exposure to nitrogen-containing groups (e.g., nitrate ions $NO_3^-$), some of which may cure in an epoxy and/or include an amine-containing group. In addition, or the alternative, the first polymeric chain and/or the second polymeric chain may be prepared to include liquid bisphenol A epichlorohydrin-based epoxy resin, polyoxyethylene bis(glycidyl ether) having an average $M_n$ of 500 (PEG-DEG-500), and polyoxypropylenediamine.

For example, in one implementation, the polymeric chain(s) may be prepared to include between 2 wt. %-5 wt. %, of difunctional bisphenol A/epichlorohydrin derived liquid epoxy resin, between 15 wt. %-25 wt. % of polyoxyethylene bis(glycidyl ether) (PEG-DEG-500) having an average $M_n$ of 500, between 20 wt. %-25 wt. % of diaminopolypropylene glycol, between 5 wt. %-15 wt. % of poly(propylene glycol) bis(2-aminopropyl ether), between 5 wt. %-15 wt. % of lithium bis(trifluoromethanesulfonyl)imide (LiTFSI), and between 40 wt. %-60 wt. % of lithium lanthanum zirconium oxide (LLZO). In some other aspects, the polymeric chain(s) may be prepared to include between 2 wt. %-5 wt. % of difunctional bisphenol A/epichlorohydrin derived liquid epoxy resin, between 15 wt. %-25 wt. % of polyoxyethylene bis(glycidyl ether) having an average $M_n$ of 500, between 5 wt. %-15 wt. % of 3,4-epoxy cyclohexyl methyl-3,4-epoxy cyclohexane carboxylate (ECC), between 15 wt. %-20 wt. % of lithium bis(trifluoromethanesulfonyl)imide (LiTFSI), between 40 wt. %-60 wt. % of lithium lanthanum zirconium oxide (LLZO), and between 1 wt. %-5 wt. % of diphenyliodonium hexafluorophosphate (DPIHFP).

In addition, the protective layer may be coated and/or deposited onto the anode by a roll-to-roll apparatus. For example, the protective layer is one or more of spray coated, gravure coated, micro gravure coated, slot-die coated, doctor-blade coated, and/or Mayer's rod spiral-coated onto the anode.

Alternatively, the polymer support system may be selectively conductive to lithium ions, without being conductive to polysulfides present within the electrochemical cell. Exemplary materials and compounds that exhibit permeability and/or ionic conductivity to lithium ions without conducting polysulfides (also referred to herein as lithium ion transporting compounds) and which are suitable for use in the context of the presently disclosed inventive concepts include, without limitation, palladium (II) oxide, lithium cobalt oxide ($LiCoO_2$), lithium lanthanides (such as lithium lanthanum zirconium oxide (LLZO) ($Li_7Li_3Zr_2O_{12}$)), diphenyliodonium hexafluorophosphate (DPIHFP), lithium borohydride ($LiBH_4$) lithium bis(trifluoromethanesulfonyl)imide (LiTFSI) ($LiC_2F_6NO_4S_2$), lithium thiophosphates (e.g., $Li_7P_3S_{11}$ and $Li_{10}GeP_2S_{12}$ (LGPS)), NASICON (e.g., $Li_{1.3}Al_{0.3}Ti_{1.7}(PO_4)_3$(LATP)), perovskite (e.g., $Li_{0.5}La_{0.5}TiO_3$, (LLTO)), lithium azide ($Li_3N$), argyrodite (e.g., $Li_6PS_5Cl$), or any of the foregoing exemplary polymer chain and/or electrolyte compositions, as well as suitable combination(s) and/or equivalent(s) thereof that would be appreciated by a person having ordinary skill in the art upon reading the present disclosure.

Figure 2:
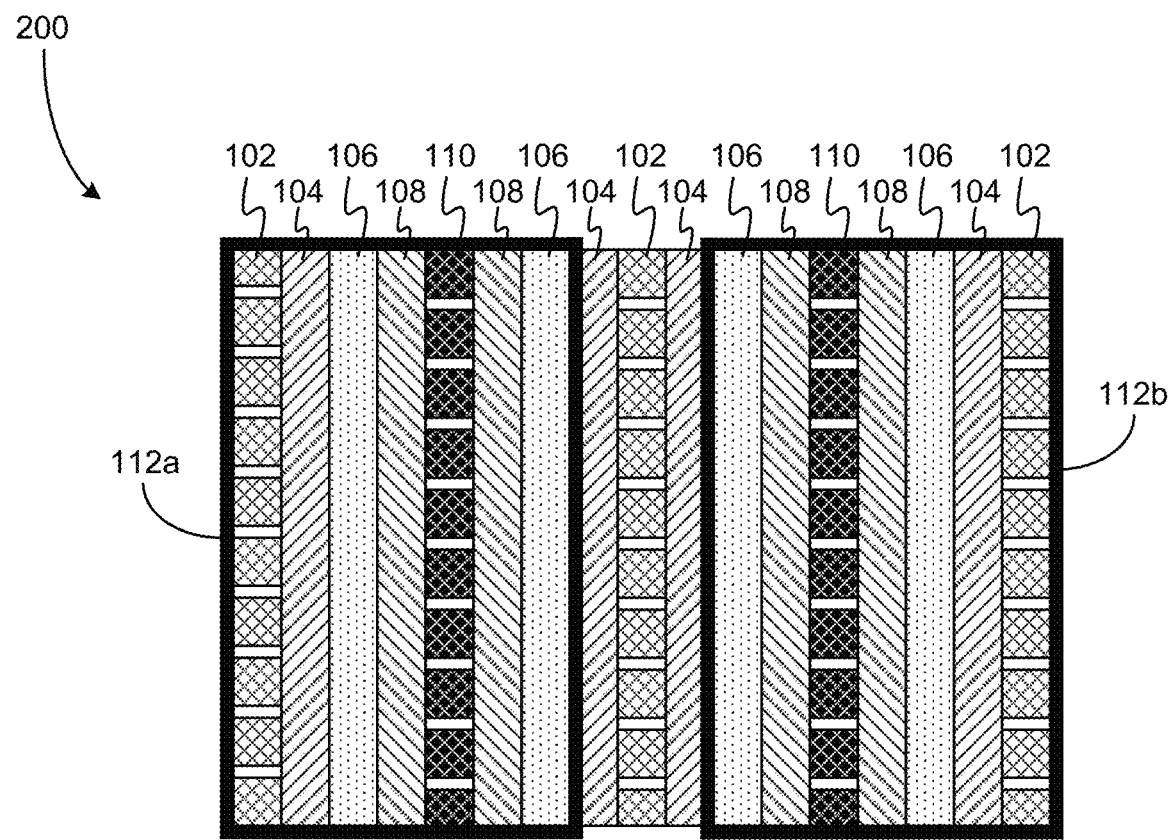
FIG. 2 illustrates a simplified schematic of an electrochemical cell having a polymeric support including a casing surrounding an exterior of the electrochemical cell and a plurality of polymeric support structures interpenetrating the cell along a direction parallel to a longitudinal axis of constituent layers of the electrochemical cell, in accordance with one embodiment.

FIG. 2 illustrates a simplified schematic of an electrochemical cell 200 having a plurality of polymeric support structures 112a, 112b surrounding select portions of an exterior of the electrochemical cell 200 and interpenetrating the electrochemical cell 200 along a direction parallel to a longitudinal axis of constituent layers 102-110 of the electrochemical cell 120, in accordance with one embodiment. The benefits of this type of approach allow for flexibility of design and a 'floating' portion of the cell in the event parts of the cell expand more/less and/or have higher/lower thermal loads. The curable parts of the cell only need be on one surface, for example a UV curable may only need to only have one side cured from the energy source with the backside needing no such treatment, or a different form of treatment for curing purposes. Additionally, this type of arrangement allows for non-cylindrical embodiments, such as prismatic configurations, or other configurations characterized by a structure that does not need to fit a specific definition of a known space or geometry.

Figure 3A:
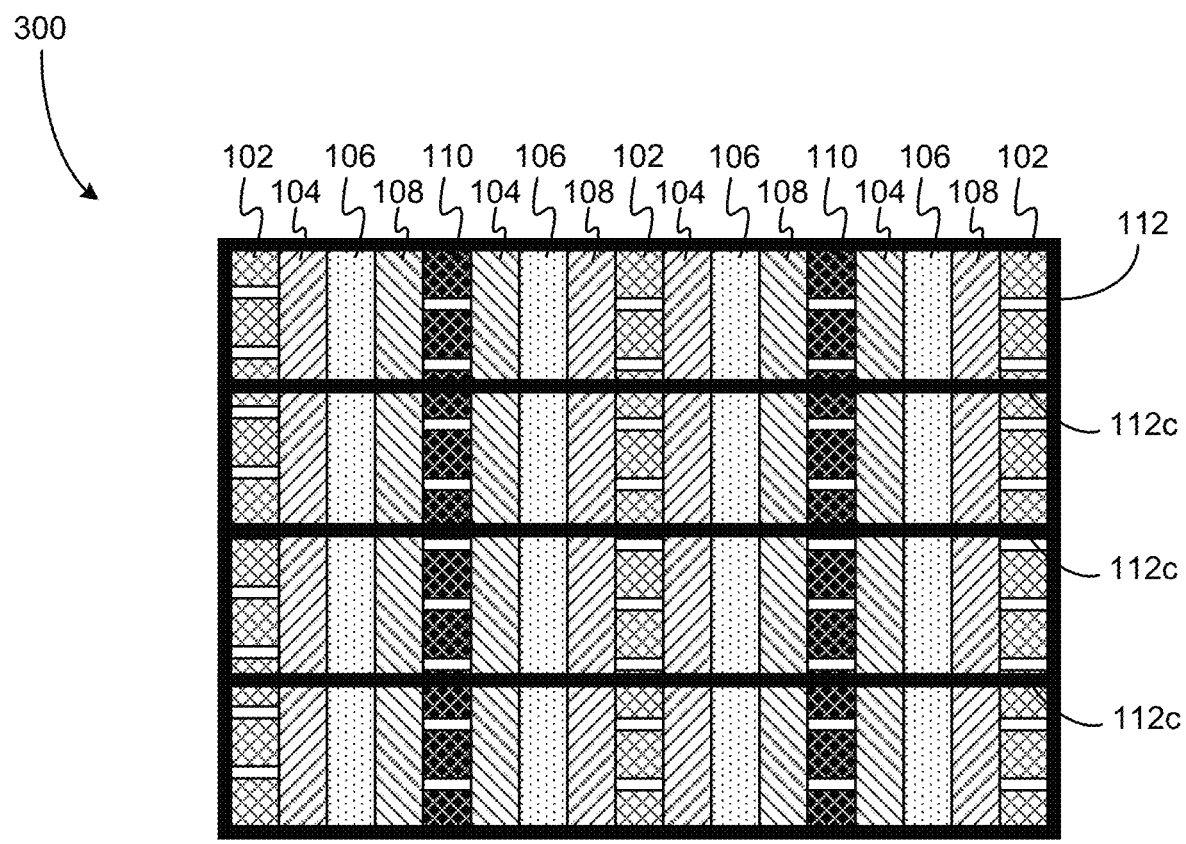
FIG. 3A illustrates a simplified schematic of an electrochemical cell having a polymeric support system including a casing surrounding an exterior of the electrochemical cell and a plurality of polymeric support structures interpenetrating the cell along a direction perpendicular to a longitudinal axis of constituent layers of the electrochemical cell, in accordance with one embodiment, in accordance with one embodiment.

FIG. 3A illustrates a simplified schematic of an electrochemical cell 300 having a polymeric support structure 112 surrounding an exterior of the electrochemical cell 300 and a plurality of polymeric support structures 112c interpenetrating the cell along a direction perpendicular to a longitudinal axis of constituent layers 102-110 of the electrochemical cell 300, in accordance with one embodiment. As will be understood by persons having ordinary skill in the art upon reading the present disclosure, the interpenetrating polymeric support structures 112c provide additional mechanical strength, particularly in a direction perpendicular to the longitudinal axis of the various layers 102-110 of the electrochemical cell. Of course, other spatial arrangements of the interpenetrating support structures may be employed without limitation and without departing from the scope of the inventive concepts described herein.

Figure 3B:
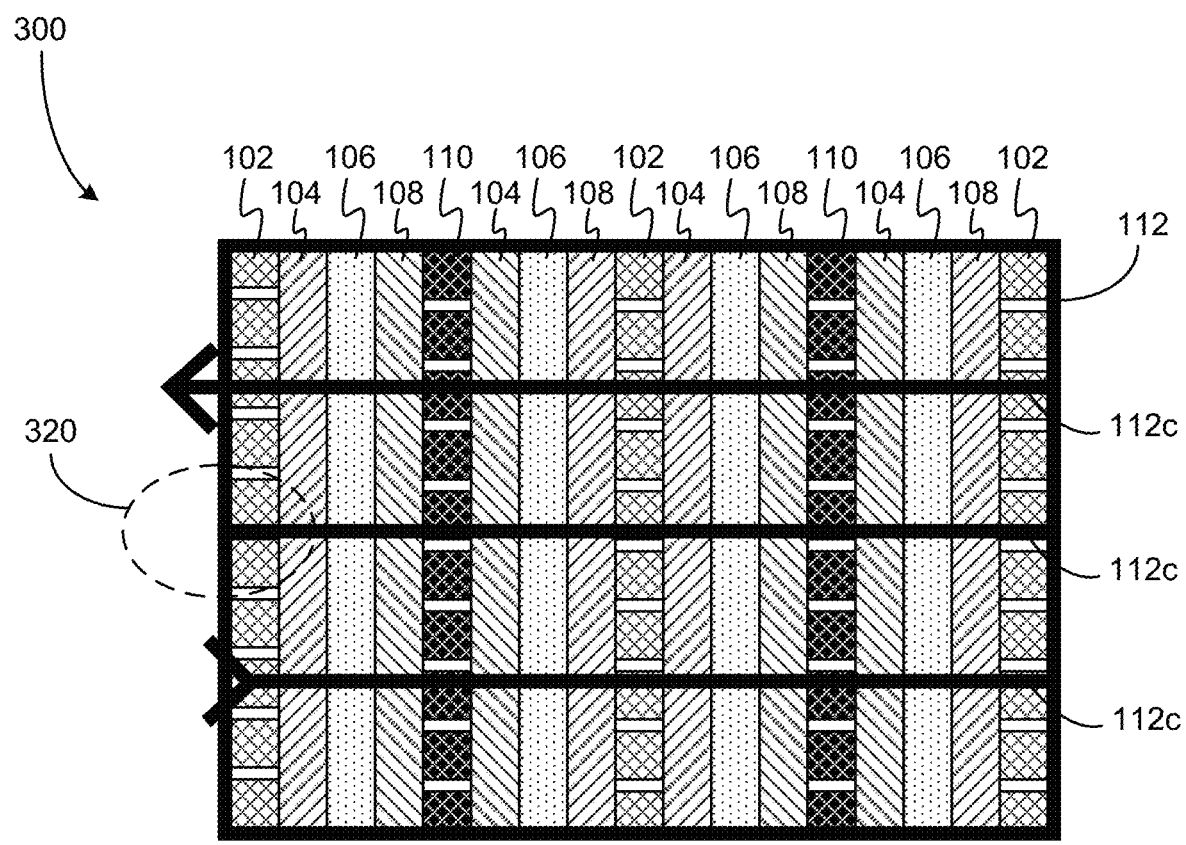
FIG. 3B illustrates a simplified schematic of the electrochemical cell in FIG. 3A, where the polymeric support structures interpenetrating the cell have chemical anchors configured to mechanically support the electrochemical cell and optionally configured to indicate a likelihood of mechanical failure of the electrochemical cell, in accordance with one embodiment.

FIG. 3B illustrates a simplified schematic of the electrochemical cell 300 as shown in FIG. 3A, where the polymeric support structures 112c interpenetrating the cell have chemical anchors configured to mechanically support the electrochemical cell and optionally configured to indicate a likelihood of mechanical failure of the electrochemical cell, in accordance with one embodiment. Moreover, the chemical anchors are preferably configured, e.g., via structural arrangement, to provide a spring-like functionality to the polymeric support structures 112c, advantageously applying pressure to the internal volume of the electrochemical cell, while also providing a degree of flexibility suitable to accommodate volumetric changes occurring during natural operation (e.g., cycling) of the electrochemical cell.

Figure 3C:
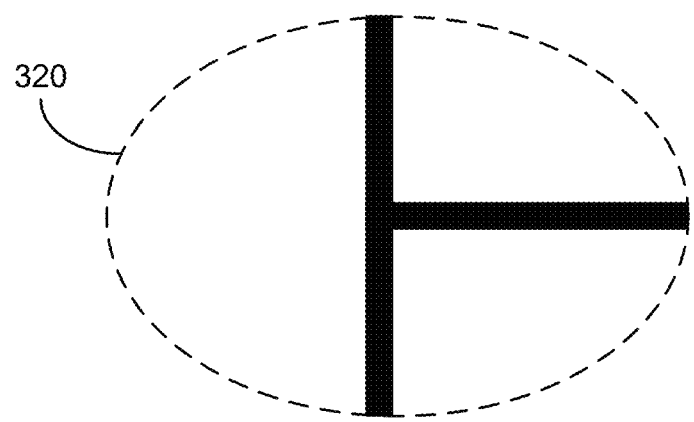
FIG. 3C is a magnified view of one of the chemical anchors shown in FIG. 3B, in a fully impinged state, in accordance with one embodiment.

FIG. 3C is a magnified view of one of the chemical anchors shown in FIG. 3B, in a fully impinged state, in accordance with one embodiment.

In various implementations, the chemical anchors preferably comprise one or more compounds (particularly polymers), such as thermoplastic olefin(s), thermoplastic polyolefin(s), olefinic thermoplastic elastomer-type structure(s), thermoplastic polymers, photopolymers, liquid crystal polymers, crosslinking polymers, acrylics, copolymers, epoxies, silicones, etc. as would be understood by a person having ordinary skill in the art upon reading the present disclosure, as well as combinations thereof, without departing from the scope of the inventive concepts described herein. It shall be appreciated that suitable compounds for use as chemical anchors include amorphous compounds as well as semi-crystalline compounds, according to various embodiments.

More specifically, exemplary compounds suitable for use in implementing chemical anchors as described herein may include any combination or permutation of: polytrimethylene terephthalate, polyethersulfone, high density polyethylene, low density polyethylene, linear low density polyethylene, polypropylene, polyolefin copolymers, polystyrene, polystyrene copolymers, polythene, polyvinyl halides, polyvinyl alcohols, polytetrafluoroethylene (TEFLON(R)), polyacrylates, polymethacrylates, polyesters, polyvinylchloride, fluoropolymers, polyamides, polyamide-imides, polyether imides, polyphenylene sulfides, polysulfones, polyacetals, polycarbonates, polyphenylene oxides, polyurethanes, thermoplastic elastomers, epoxies, alkyds, melamines, phenolics, ureas, vinyl esters, etc.; epoxies, hybridized crosslinking polymers, cyanate esters, polyurethanes, acrylonitric butadiene styrene (ABS) and polyacrylonitrile (PAN); ethylene vinyl alcohol, poly(methyl methacrylate) (PMMA), polyvinyl cinnamate, polyisoprene, polyamides, polyimides, styrenic block copolymers, bitumen, nitrile rubber, polycarbonate, polyetherimide (PEI), poly(pheylene sulfide) (PPS), polyetheretherketone PEEK), polyetherketones (PEK), etc., as would be appreciated by a person having ordinary skill in the art upon reading the present disclosure.

In select embodiments, the foregoing compounds(s) suitable for use as chemical anchors may include or be provided in the form of composite materials, particularly composites of polymers and carbon fibers, and/or composites of polymers and three-dimensional graphene (3DG), such as described in U.S. patent application Ser. No. 18/115,643, filed Feb. 28, 2023 and entitled "Polymer Matrix Composites, and Methods of Making the Same", the contents of which are herein incorporated by reference in entirety.

For example, referring to 3DG, in various approaches polymers may be reinforced with three-dimensional graphene (3DG) (as referenced herein, three-dimensional graphene shall be understood as referring to graphene-based structures characterized by $sp^3$ orbital hybridization, including but not limited to single-layer graphene (SLG); few-layer graphene (FLG) including, e.g., 3-5 layers of graphene; multi-layer graphene (MLG) including, e.g., more than five layers of graphene, etc. as would be understood by persons having ordinary skill in the art upon reading the present disclosure. Moreover, 3DG may be provided in the form of graphene platelets, and/or may be characterized by including one or more ligands extending from a bulk of the graphene platelet. 3DG ligands may be integrated into polymers of various types described herein, providing mechanical strength to the composite graphene-polymer system.

Further still, chemical anchors may, in some approaches, include combination(s) of the above constituents and/or features, without limitation and without departing from the scope of the inventive concepts presented herein. For instance, one exemplary combination may include a thermoplastic polymer (e.g., PEEK) partially or wholly disposed in a cyanate ester composite optionally having laced-butadiene particles disposed therethrough.

Figure 4A:
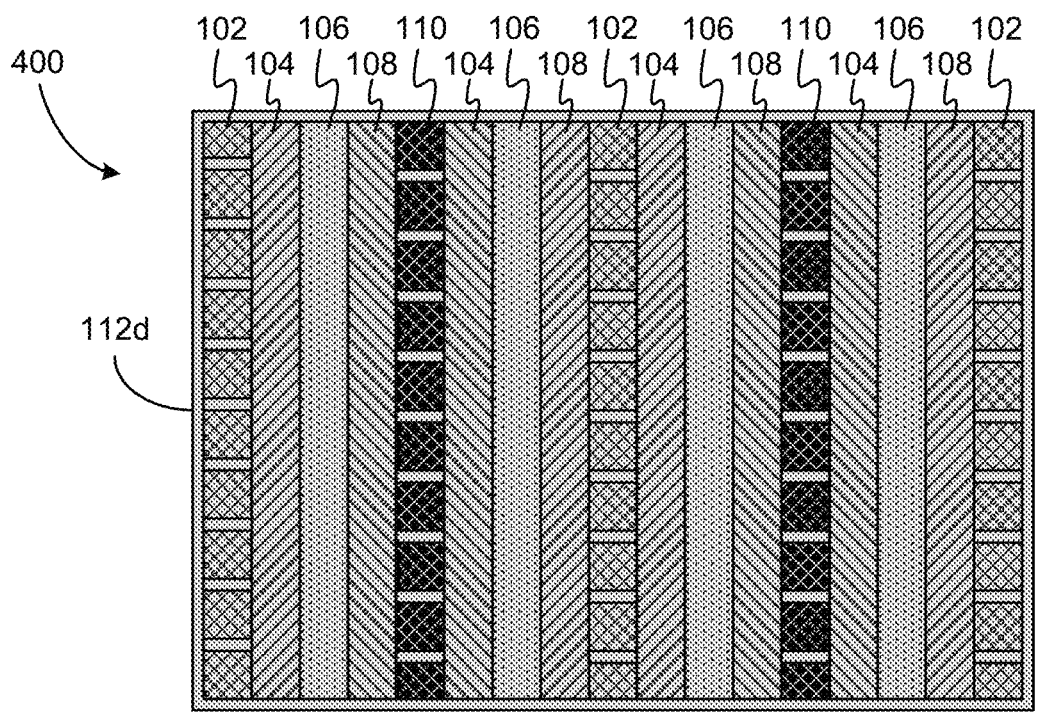
FIG. 4A illustrates a simplified schematic of an electrochemical cell configured to be arranged in a cylindrical "jelly roll" configuration and having a polymeric support system including a polymeric coating on surfaces of the cell and in interstitial spaces between the rolled cell configuration, in accordance with one embodiment.

FIG. 4A illustrates a simplified schematic of an electrochemical cell 400 configured to be arranged in a cylindrical "jelly roll" configuration and having a polymeric support structure 112d coating all surfaces of the cell 400, and present in interstitial spaces between the rolled layers of the cell 400, in accordance with one embodiment.

Figure 4B:
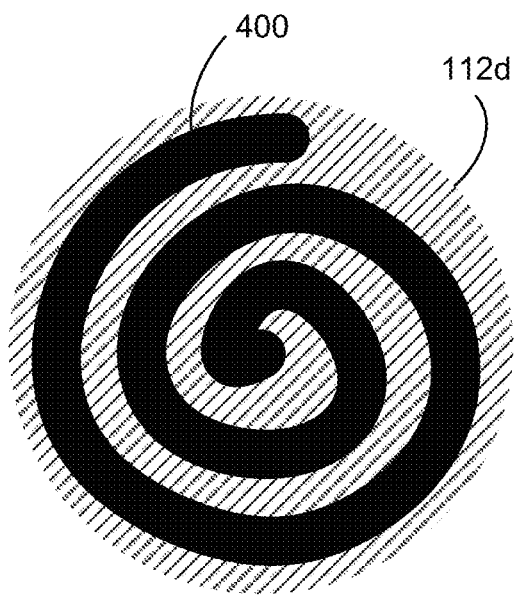
FIG. 4B shows the electrochemical cell of FIG. 4A in the cylindrical "jelly roll" configuration, from a side view and in accordance with one embodiment.

FIG. 4B shows the electrochemical cell 400 (black spiral) of FIG. 4A in the cylindrical "jelly roll" configuration, from a side view and in accordance with one embodiment. While the exemplary "jelly roll" configuration shown in FIG. 4B is cylindrical, it shall be understood that the inventive concepts presented herein are equally applicable to other arrangements, particularly spiral and spiral-like arrangements of electrochemical cell(s) and polymeric coatings, but also including concentric arrangements of electrochemical cell(s) and polymeric coatings, serpentine arrangements of electrochemical cell(s) and polymeric coatings, prismatic arrangements, stacked arrangements, laminar structures, layered structures, etc. as would be understood by those having ordinary skill in the art upon reading the present descriptions and reviewing the accompanying Figures.

Though not shown in FIGS. 1B-4B, it shall be understood that according to various embodiments, the depicted electrochemical cells may include a continuous polymer network such as continuous polymer network 116 as shown and described with respect to FIG. 1A in addition to the polymeric support(s) expressly shown in FIGS. 1B-4B. Moreover, the various arrangements shown in FIGS. 1A-4B may be combined in any suitable manner without departing from the scope of the present disclosure, and may convey an additive or synergistic increase on mechanical strength of the resulting electrochemical cell.

Figure 5A:
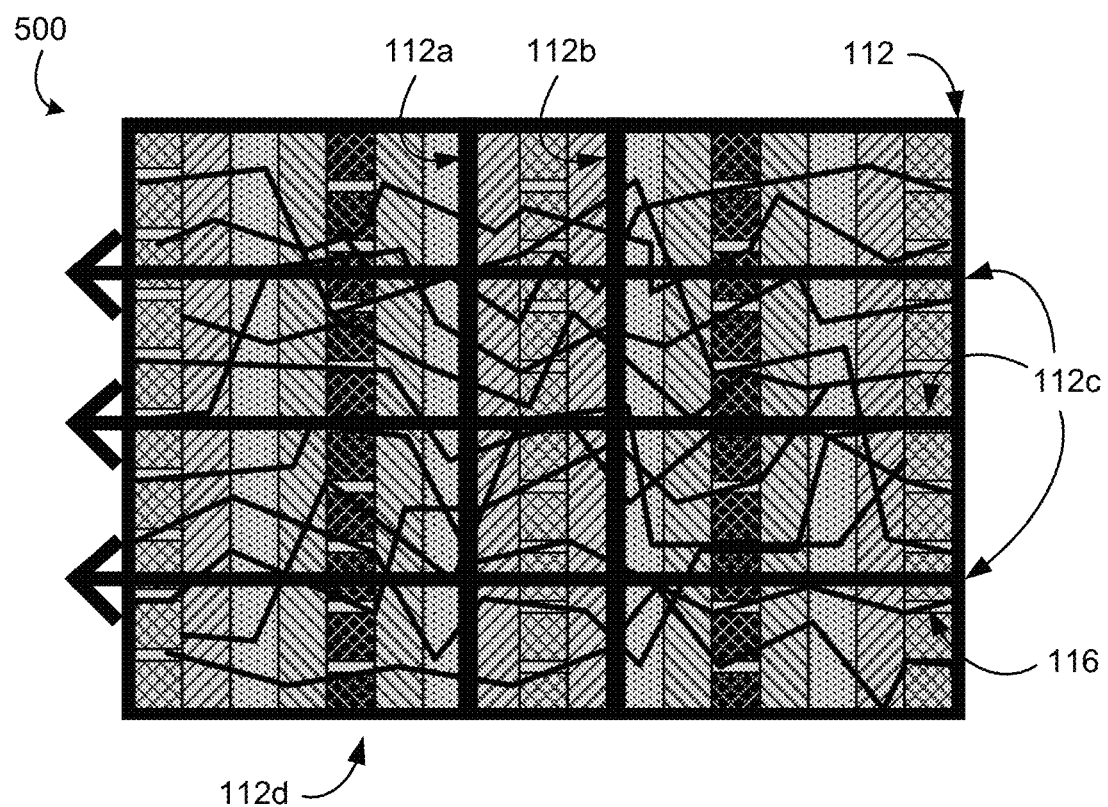
FIG. 5A is a simplified schematic of an electrochemical cell including a continuous polymeric network such as shown in FIG. 1 in combination with a plurality of polymer support structures as shown in FIGS. 2-4, according to one exemplary implementation.

For instance, FIG. 5A depicts a simplified schematic of an electrochemical cell 500 including a combination of all polymeric support structures 112-112d and continuous polymeric network 116 as shown in FIGS. 1-4B, according to one exemplary implementation.

Figure 5B:
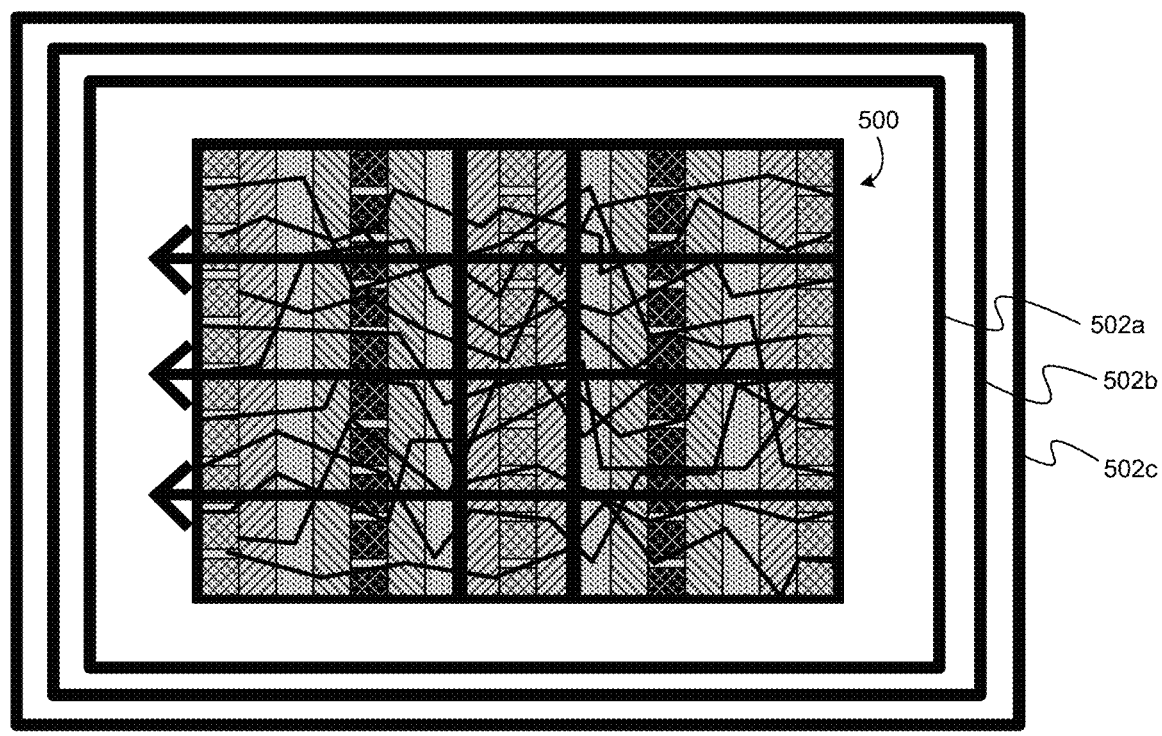
FIG. 5B is a simplified schematic of an electrochemical cell such as shown in FIG. 5A coupled to a plurality of external components, according to one exemplary implementation.

In addition, the electrochemical cell 500 may, according to select embodiments, may optionally be coupled to one or more external components 502a, 502b, 502c, such as shown in FIG. 5B. which are preferably configured to provide additional protection (mechanical, chemical, electrical, etc.) to the electrochemical cell. For instance, in various embodiments such external components 502a, 502b, 502c may be or include any combination of an external casing, a module, an assembly (such as a parallel assembly, an in-series assembly, a cell-to-chassis assembly, etc.) a pack, a pouch, a tray, a can, a chassis, etc. and any suitable equivalent(s) thereof, as would be understood by persons having ordinary skill in the art upon reading the present disclosure. The external components 502a, 502b, 502c, as shown in FIG. 5B, may be arranged in a hierarchical fashion, as concentric structures, or according to any other suitable arrangement or configuration that would be understood by those having ordinary skill in the art upon reading the instant disclosure.

Moreover, multiple of the foregoing exemplary forms of external components 502a, 502b, 502c may be included in devices or systems without departing from the scope of the inventive concepts presented herein, and may be present according to any suitable arrangement or hierarchy of external components 502a, 502b, 502c. For example, in one embodiment an electrochemical cell 500 may be enclosed by casing and coupled to other components (such as leads, tabs, contacts, etc.) to form a battery, which may in turn be enclosed by a module, which may be part of an assembly that is in turn enclosed by a pack, pouch, can, or the like, and which may in turn be at least partially enclosed or otherwise supported by a tray. Of course, other arrangements of electrochemical cells 500 and external components 502a, 502b, 502c that would be appreciated as suitable by those having ordinary skill in the art, and informed of the instant disclosure, may be implemented without departing from the scope of the inventive concepts currently described.

Figure 6A:
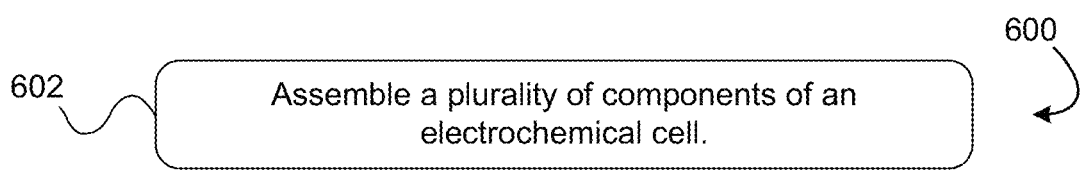
FIG. 6A illustrates a flowchart of a method, in accordance with one embodiment.

FIG. 6A illustrates a flowchart of a method for fabricating electrochemical cells having a polymer support system 116 or a continuous network of precursors of a polymer support system 116a, in accordance with various embodiments. As an option, the method 600 may be implemented in the context of any one or more of the embodiments set forth in any previous and/or subsequent figure(s) and/or description thereof. Of course, however, the method 600 may be implemented in the context of any desired environment, including those shown in FIGS. 1-5B and described hereinabove. Further, the aforementioned definitions may equally apply to the description below.

Figure 6B:
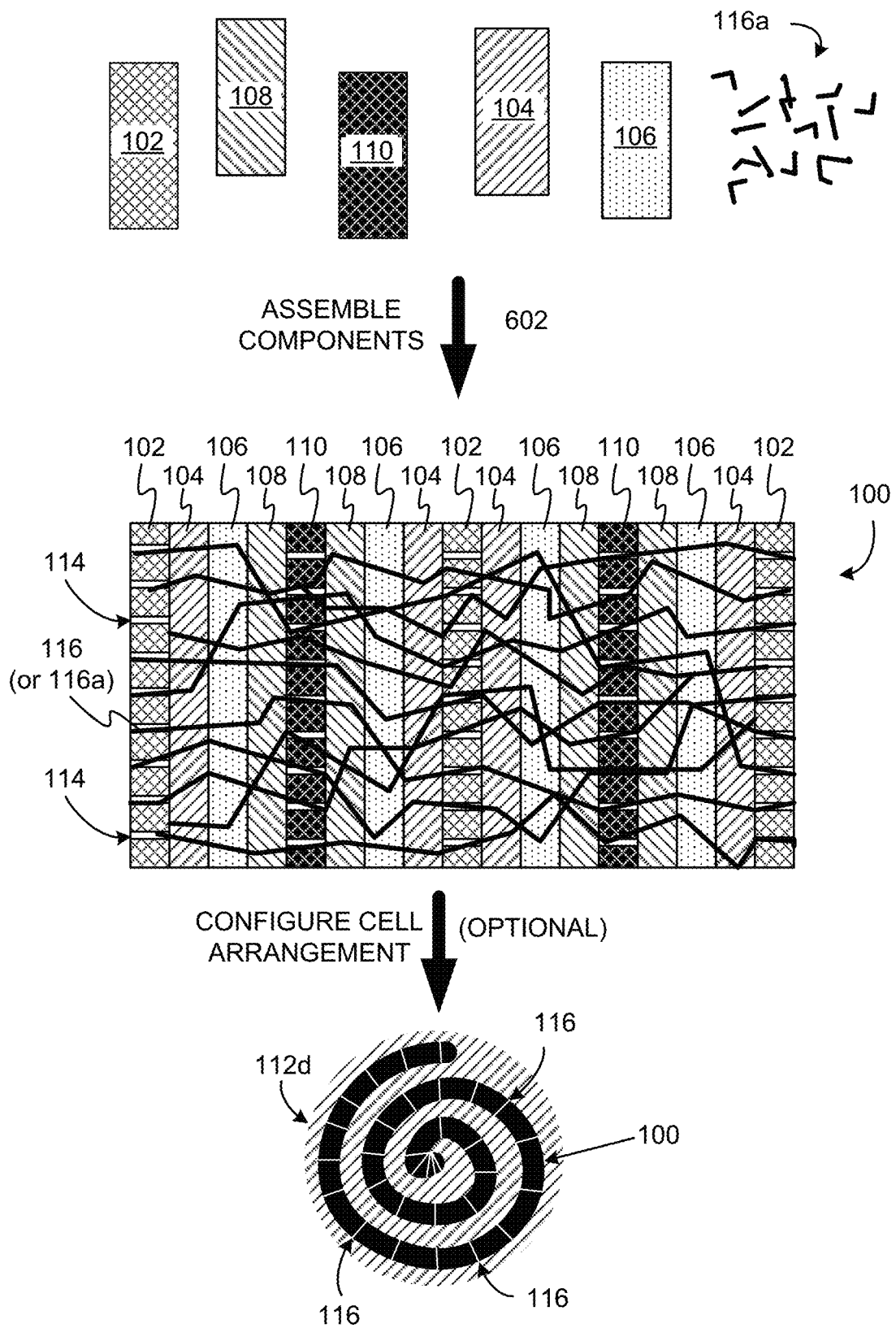
FIG. 6B illustrates a simplified schematic flowgram of the method as shown in FIG. 6A, including an optional operation for configuring an arrangement of the electrochemical cell, in accordance with one embodiment.

As shown in FIGS. 6A-6B, method 600 includes assembling a plurality of components of an electrochemical cell in operation 602. The components include an anode current collector 102 (optional); an anode active material 104; a porous separator 106; a cathode active material 108; a cathode current collector 110 (optional); and a continuous network of precursors of a polymer support system 116a. Importantly, the continuous network includes or is present in the form of a plurality of continuous pathways extending from the anode current collector to the cathode current collector. Preferably, each continuous pathway penetrates the anode current collector 102 (optional); an anode active material 104; a porous separator 106; a cathode active material 108; a cathode current collector 110 (optional), and any other component(s) present between the anode current collector and the cathode current collector.

Assembling the various components of the electrochemical cell, according to various approaches, may be performed according to or involving any suitable technique, but according to preferred embodiments assembly may involve additive manufacturing, injection molding, compression molding, hybrid injection and compression molding, pre-forming, hand layup techniques, casting, infusion, sintering, or any suitable equivalents or combinations thereof as would be appreciated by persons having ordinary skill in the art upon reading the present disclosure.

For instance, FIG. 6B shows an exemplary arrangement of components including anode current collector 102, anode active material 104, porous separator 106, cathode active material 108, and cathode current collector 110. The various components may be assembled using any of the foregoing techniques, or combinations or equivalents thereof that would be understood by those having ordinary skill in the art upon reading the present disclosure, in accordance with different implementations of operation 602 of method 600. Of course, additional components beyond those shown in FIG. 6B but described herein, such as polymeric precursors, binders, terminators, initiators, scavenging materials, cross-linkers, solvent systems, carbonaceous materials, thermosetting systems, thermoplastic systems, etc. as described herein, may be included in the set of components assembled into an electrochemical cell in accordance with operation 602 of method 600.

Either during fabrication of the electrochemical cell, fabrication of a battery including the electrochemical cell, or after fabrication thereof, the precursors may be cured to form the polymer support system. According to various embodiments, curing may be driven chemically, thermally, optically, or kinetically. As shown in FIG. 6B, the assembled electrochemical cell 100 includes a cured, continuous polymer network 116, although skilled artisans will appreciate that alternative embodiments of method 600 may yield an electrochemical cell having a continuous network of polymeric precursors 116a such as shown in FIG. 1B, without departing from the scope of the inventive concepts presented herein.

For example, chemical curing may include initiating one or more chemical reactions to polymerize polymeric precursor(s) present in or forming the continuous pathways of the continuous network. In one embodiment, chemical curing may be driven by exposing polymer precursors to aqueous solution or moisture, e.g., an aqueous electrolyte solution present in the electrochemical cell, to initiate polymerization. For example, cyanoacrylate esters are a suitable polymer system to be cured via exposure to aqueous conditions or moisture.

Similarly, thermal curing may involve heating the electrochemical cell using an external heat source. Different implementations may utilize any suitable source of external heat that would be appreciated by a person having ordinary skill in the art upon reading the present descriptions without departing from the scope of the inventive concepts disclosed herein. According to various approaches, thermal curing may involve achieving an internal temperature in a range from about 15 C to about 200 C within the internal volume of the electrochemical cell, again using an external source of thermal energy. As will be appreciated by skilled artisans upon reviewing the detailed description herein, the particular temperature required for thermal curing may vary according to the polymer precursors (or polymer system) to be implemented. For instance, a polymer system comprising photopolymers may be thermally cured at room temperature (e.g., a temperature in a range from about 23 C to about 27 C) and ambient pressure (e.g., about 1 atm). A polymer system including thermosetting materials may be cured, according to various embodiments, at a temperature in a range from about 40 C to about 200 C.

Further, optical curing may involve exposing the electrochemical cell to one or more sources of electromagnetic radiation, such as visible light, ultraviolet light, X-ray radiation, gamma radiation, or any combination or equivalent thereof as would be appreciated by those having ordinary skill in the art upon reading the present disclosure. Accordingly, embodiments of the inventive electrochemical cells configured for optical curing preferably include components and/or a casing that is transparent or permissible to the type(s) of electromagnetic radiation to be used during curing.

Further still, kinetic curing may involve selecting particular polymeric precursors, initiators, etc. that undergo polymerization under predetermined kinetic conditions, which may be induced internal factors acting on the electrochemical cell (e.g., heat generated during the first few (1-5) cycles) during normal operation thereof. According to various approaches, kinetic curing may involve achieving an internal temperature in a range from about 15 C to about 200 C within the internal volume of the electrochemical cell. As will be appreciated by skilled artisans upon reviewing the detailed description herein, the particular temperature required for kinetic curing may vary according to the polymer precursors (or polymer system) to be implemented. For instance, a polymer system comprising photopolymers may be thermally cured at room temperature (e.g., a temperature in a range from about 23 C to about 27 C) and ambient pressure (e.g., about 1 atm). A polymer system including thermosetting materials may be cured, according to various embodiments, at a temperature in a range from about 40 C to about 200 C. Further still, polymer systems including exothermally reactive components, such as bisphenol-A & epichlorohydrin, may thermally initiate curing upon mixing thereof using the exothermal heat generated by the polymerization reaction occurring therebetween. Other means for generating heat within the internal environment of a battery will be appreciated by those having ordinary skill in the art upon reading the present disclosure, and may be employed without departing from the scope of the inventive concepts presented herein.

To be clear, while thermal curing and kinetic curing both utilize heat as an initiation mechanism, thermal curing relies on heat generated by external sources, while kinetic curing relies on heat generated within the internal environment of the battery itself.

As will be appreciated by those having ordinary skill in the art upon reading the present disclosure, one advantage of the inventive concepts described herein is the ability to control timing of formation of the polymer support system. For instance, the polymer support system may be formed as part of the fabrication process, or after fabrication of the electrochemical cell (or even corresponding battery including the electrochemical cell) is complete. Curing may even occur "passively", i.e., without performing any action with respect to the electrochemical cell other than normal operation (e.g. cycling) thereof, according to select embodiments.

In more approaches, method 600 may include crosslinking polymers of the formed polymer support system. Crosslinking may occur during the polymerization of polymeric precursors, or may be performed as a separate operation after curing is complete.

In addition to the assembly of the continuous network, method 600 may include formation of additional support structure(s) on or in the electrochemical cell. For instance, in one approach method 600 involves coating external surface(s) of the electrochemical cell with precursors of the polymer support system, and curing the precursors to form a casing surrounding the electrochemical cell. In some approaches, the casing may be optically transparent, e.g., where the polymer precursors include polycarbonates.

Similarly, method 600 may include forming one or more interpenetrating support structure precursors within the electrochemical cell, each interpenetrating support structure independently comprising the precursors of the polymer support system; and curing the precursors to form the interpenetrating support structures within the electrochemical cell.

The interpenetrating support structures, according to various implementations, may be aligned along a direction parallel to a longitudinal axis of the porous separator, as is the case for support structures 112a and 112b shown in FIG. 2, may be aligned along a direction perpendicular to a longitudinal axis of the porous separator, as is the case for polymeric support structures 112c shown in FIGS. 3A-3B, or both, as shown in FIG. 5A.

In still more approaches, method 600 may involve arranging the electrochemical cell 100, 400 in a jelly-roll configuration, such as shown in FIGS. 4B and 6B. Preferably, the precursors of the polymeric support system are present in interstitial spaces of the jelly-roll configuration, and coat surfaces of the electrochemical cell 100, 400, such that the electrochemical cell 100, 400 is effectively encased in the precursors. Of course, preferably the method includes curing the precursors to form the polymer support system, which may yield multiple continuous polymeric networks 116 (white lines) penetrating the various components of the electrochemical cell 100, 400, e.g., penetrating various layers or components of the electrochemical cell 100, 400 in a direction normal or orthogonal to an axis around which the jelly-roll configuration was wound. Of course, other embodiments may involve configuring the electrochemical cell 100, 400 according to different arrangements, but it shall be appreciated that such differences in no way prohibit the inclusion of continuous polymeric network(s) 116, or continuous networks of precursors of polymeric network(s) 116a, without limitation as to the structural arrangement of said networks 116, 116a relative to the arrangement of the electrochemical cell 100, 400.

Without limitation, the general method 600 depicted in FIG. 6A may be performed, in whole or in part, using techniques such as additive manufacturing, injection molding, compression molding, hybrid injection and compression molding, pre-forming, hand layup techniques, casting, infusion, sintering, etc. as would be appreciated by those having ordinary skill in the art upon reading the present disclosure.

Advantages and Applications

In addition to various advantages described hereinabove regarding the implementation of a polymer support system in lieu of a conventional, metal-based compressive structure, skilled artisans will appreciate that the polymer support system may be engineered to exhibit characteristics particularly suitable for desired applications, e.g., by selecting particular components having desired characteristics such as optical transparency, kinetic profiles, thermal conductivity, ionic conductivity, electrical conductivity, mechanical strength (especially tensile or compressive strength), improved flexibility, reduced weight, simplified fabrication (e.g., by reducing material cost, reducing risk of introducing defects during fabrication, etc.), reduced weight, improved recyclability, protection against electromagnetic radiation or interference (EMI), producing favorable electrochemical conditions within the cell, etc. as described herein and as would be understood by a person having ordinary skill in the art upon reading the present disclosure. Moreover, according to select embodiments, the inventive concepts presented herein may include or convey any number, combination, permutation, or equivalents of the above-referenced and below-described advantages, without departing from the scope of the invention.

According to various implementations, using a polymeric support system rather than a conventional, metal-based compressive structure simplifies the fabrication process while allowing flexibility with respect to location of the supporting structures. For example, referring again to a "jelly roll" battery configuration, the electrochemical cell must be rolled, inserted into the "can" (e.g., a metal-based compressive structure), and sealed. In practice, this process can result in puncturing of the cell, crimping of the cell, and other undesirable damage to the cell. This packaging process can be eliminated when using a polymer support system as described herein, and the polymer support system may be cured over time to gradually provide desired compression thereto.

In addition, using a polymeric support system rather than a conventional metal-based compressive structure provides substantial flexibility with respect to the fabrication techniques that may be implemented. This, in turn, enables precise control and design of the electrochemical cell, including but not limited to fabrication of unconventional cell configurations (e.g., custom-designed shapes to comport with structural arrangement of the apparatus in which the battery is to be utilized), reduced volume of the overall cell and support structure, highly controllable feature size, etc. as would be appreciated by skilled artisans upon reviewing the inventive concepts presented herein. According to various approaches, suitable fabrication techniques include additive manufacturing, injection molding, compression molding, hybrid injection and compression molding, pre-forming, hand layup techniques, casting, infusion, sintering, etc. as would be appreciated by those having ordinary skill in the art upon reading the present disclosure.

Reducing the overall weight of electrochemical cells, and corresponding batteries, by replacing a conventional metal-based compressive structure with the inventive polymer support systems described herein, also known as "light-weighting" has significant and advantageous downstream impact on apparatuses and applications utilizing such batteries. As will be appreciated by skilled artisans upon reading the present disclosure, reducing the weight of a battery reduces the overall weight of the apparatus including the battery. For various applications involving moving systems, such as vehicles, aerospace applications, robotics, reducing the weight of the battery allows for longer range and operational duration, increased payload, reduced wear, improved power-to-weight ratio, etc. as would be understood by those having ordinary skill in the art upon reading the present description. Moreover, financial and environmental cost of transporting batteries from fabrication facilities to distributors, and ultimate end users, is reduced as a function of the reduced weight of the batteries.

As noted above, and exemplified according to one embodiment in FIG. 5A, one particular advantage of employing a polymeric support system as described herein rather than a conventional metal-based compressive structure is that the polymeric support system may be configured, e.g., by implementing certain polymers having particularly strong mechanical properties such as described hereinabove in a continuous polymer network 116, by implementing certain spatial arrangements of the polymeric support structures 112-112d as shown in FIGS. 2-4, and/or by combining different configurations of polymeric support structures 112-112d such as shown in FIG. 5A, the presently disclosed inventive concepts enable electrochemical cells with superior mechanical strength than even electrochemical cells employing a conventional metal-based compressive structure.

Accordingly, in preferred approaches a battery may include an electrochemical cell such as shown in FIGS. 1A-5, and may be formed in accordance with a method such as shown and described with reference to FIG. 6. In particularly preferred approaches, the battery includes a protective mechanism, such as continuous polymeric network 116, interpenetrating support structures 112-112d, or combinations or equivalents thereof (such as a casing or enclosure surrounding the battery, a support structure present in interstitial spaces of a jelly-rolled electrochemical cell such as shown in FIG. 4B, a pack, a pouch, a module, an assembly, a pan, a tray, a can, etc.) as would be appreciated by a person having ordinary skill in the art upon reading the present disclosures.

More preferably, the protective mechanism, which may be configured to exert compressive force on the electrochemical cell, is substantially non-metallic, and may substantially exclude metals such as aluminum, steel, alloys thereof, and combinations thereof. The protective mechanism may also substantially exclude other conventional, "heavy" materials such as ceramics, cermets, etc., in certain approaches. By "substantially exclude", it is understood that the inventive concepts presented herein do not include the corresponding compounds in any effective amount, but that trace impurities may be present without departing from the scope of the inventive concepts described herein. Rather than conventional, "heavy" materials, the protective mechanism preferably comprises polymers, polymeric precursors, other compounds expressly described herein, or any suitable combination thereof.

Moreover, the inventive protective mechanism preferably constitutes anywhere from about 1 wt % to about 20 wt % of a total weight of the battery with which it is implemented. For instance, depending on the combination of constituents, and state of fabrication (e.g. uncured, cured, unreacted, reacted, etc.), the inventive protective mechanism (referred to elsewhere herein as a "compressive structure") may initially constitute anywhere from about 1 wt % to about 20 wt % of the total weight of the battery, and in a final configuration (e.g. cured, reacted, etc.) may constitute a nonzero amount of up to about 10 wt % of the total weight of the battery. Of course, various implementations of the inventive concepts described herein may yield embodiments characterized by a protective mechanism or compressive structure that constitutes any amount of the total weight of the corresponding battery within the aforementioned limits, such as constituting about 1 wt % of the total weight of the battery, about 2.5 wt % of the total weight of the battery, about 3.3 wt % of the total weight of the battery, about 5 wt % of the total weight of the battery, about 7.5 wt % of the total weight of the battery, about 10 wt % of the total weight of the battery, about 12.5 wt % of the total weight of the battery, about 15 wt % of the total weight of the battery, about 20 wt % of the total weight of the battery, or any value or range of values between these endpoints or other endpoints generally within the overall range of about 1 wt % to about 20 wt % of the total weight of the battery, as would be appreciated by a person having ordinary skill in the art upon reading the instant descriptions.

Put another way, implementing the presently described inventive protective mechanism as a compressive structure to prevent or mitigate mechanical (and/or electrical) damage to an electrochemical cell (or indeed, a battery as a whole) may provide equivalent or superior mechanical strength to said electrochemical cell (or battery) as described hereinabove, while the battery implementing the inventive concepts may be characterized by a total weight that is anywhere from at least about 1% to about 25% less than a total weight of an otherwise substantially identical, or equivalent, battery implementing a conventional, metal-based compressive structure or protective mechanism. For instance, in various embodiments, batteries (or electrochemical cells) implementing an inventive, substantially non-metallic protective mechanism may be characterized by a total weight that is anywhere from about 1% less, about 2% less, about 2.5% less, about 3.3% less, about 5% less, about 6.6% less, about 7.5% less, about 10% less, about 12.5% less, about 15% less, about 20% less, about 25% less, or any other value or range between the aforementioned endpoints or other endpoints generally falling within the overall range of at least about 1 wt % less to at least about 25 wt % less than the overall total weight of an otherwise substantially identical or equivalent battery employing conventional, metal-based compressive structure or protective mechanism. It shall be understood that the terms "substantially identical or equivalent" batteries or electrochemical cells, as utilized immediately hereinabove, refer to a battery or electrochemical cell including the same, or functionally equivalent, components other than the protective mechanism. "Substantially identical or equivalent" batteries or electrochemical cells shall be understood as exhibiting the same, or functionally equivalent, performance characteristics, compositions, and weight, again with the exception of the protective mechanisms respectively included therein.

Moreover, it shall be understood that in the context of the presently disclosed inventive concepts, "mechanical damage" may include any form of physical damage to the battery, electrical cell, or components thereof, in various approaches. Exemplary forms of mechanical damage include, without limitation, deformation of the battery or electrochemical cell, penetration (e.g., by an external object) of the battery or electrochemical cell, exposure of the battery or electrochemical cell to an external atmosphere, delamination or physical separation of components of the battery or electrochemical cell, formation of void volumes within the internal volume of the electrochemical cell, or any other equivalent(s) or combination(s) of the foregoing examples, as would be understood by a person having ordinary skill in the art upon reading the present disclosure.

Similarly, "electrical damage" may include any form of damage to the battery or electrochemical cell caused by exposure to electricity, especially unintended electrical current(s). For instance, according to various embodiments electrical damage may include, without limitation, formation of short circuits within the electrochemical cell, formation of arc current(s) within the electrochemical cell, surging within the internal volume of the electrochemical cell, or any other equivalent(s) or combination(s) of the foregoing examples, as would be understood by a person having ordinary skill in the art upon reading the present disclosure.

Referring again to weight, the polymeric component (e.g., the continuous polymer network 116 and/or support structures 112-112d) of the inventive protective mechanism as described herein may constitute anywhere from about 5 wt % to about 20 wt % of a total weight of the battery within which the protective mechanism is implemented, while other components of the protective mechanism, such as initiators, terminators, curing agents, scavenging agents, binders, lithium-ion transporting compounds, may constitute from about 1 wt % to about 5 wt % of the total weight of the battery. Of course, any other wt % amount of polymeric or non-polymeric components falling within the overall ranges set forth above may be utilized without departing from the scope of the inventive concepts presented in this disclosure, without limitation.

In more approaches, particularly useful for aerospace applications, communications applications, vehicular applications, military applications, etc., the polymer support systems described herein may convey resistance to electromagnetic radiation, and correspondingly protect against electromagnetic interference (EMI). For example, the polymer support system may be configured to include polymers and/or polymeric precursors as disclosed herein protect against EMI when selectively tuned for specific frequencies that attenuate energy. Advantageously, this allows for further weight reduction due to minimal/no need for convention shielding approaches, such as conductive cases or faraday cages, which are typically made of metal and thus contribute significantly more weight than a tuned polymer system. Moreover, in some approaches tuned polymer systems may be present in the form of a solution or a secondary coating/layer within and/or outside the enclosure.

Additionally or alternatively, the polymer support system (or components thereof such as polymeric support structures 112-112d and/or continuous polymer network 116) may be functionalized to convey protection against EMI.

According to still more embodiments, utilizing a polymeric supports system as described herein enables creating favorable electrochemical conditions within the electrochemical cell. For instance, pressure can be tuned and applied to the interior volume of the electrochemical cell, which produces electrochemical conditions that are favorable to optimal operation of the electrochemical cell. This capability is due, in part, to the fact that the polymeric support system may be formed on or within the electrochemical cell, and selectively cured during or after fabrication in a tunable manner to create desired compression (and thus internal pressure) on the cell. This is not possible when utilizing a conventional, metal-based compressive structure, because the compressive structure must be separately fabricated and then the electrochemical cell placed therein. There is no mechanism available to further compress the electrochemical cell using the rigid metal-based compressive structure, and attempting to do so risks failure of the compressive structure and/or electrochemical cell.

As will be appreciated by those having ordinary skill in the art upon reading the present disclosure, and described hereinabove particularly with reference to FIGS. 3B-3C, employing a polymeric support system as described herein, especially where polymeric supports include chemical anchors conveying spring-like functionality to the polymeric supports, allows improved flexibility for the electrochemical cell. Among other advantages such as resistance to impact, flexibility allows for volumetric change to occur during natural cycling of the electrochemical cell without risking damage to the internal components, such as may occur when using a relatively inflexible material such as a conventional metal-based compressive structure.

Similarly, and again with reference to the chemical anchors shown in FIGS. 3B-3C, the strength of the chemical anchors may be tuned or selected in order to achieve mechanical failure under predetermined conditions within the electrochemical cell. For instance, where volumetric changes cause increasing pressure over number of cycles, or a cumulative force applied over a known number of cycles reaches a predetermined threshold, the chemical anchor may fail (e.g., may become fully impinged as shown in FIG. 3B). Such failure may be selectively timed, e.g., to occur prior to an expected failure of the electrochemical cell itself, reducing risk of hazards associated with failure of lithium-based batteries.

In more implementations, providing a selectively tunable support system makes it possible to solidify components within an electrochemical cell at a desired point in time. For instance, recycling of batteries is a complex and dangerous process that risks exposure to harsh chemicals and toxic substances. By providing a mechanism for solidifying spent, expired, or otherwise non-functioning electrochemical cell components, these risks are reduced, facilitating the overall recycling process. As an example, recycling of electrochemical cells configured in a "jelly roll" arrangement requires extraction of the jelly roll from the supporting "can", and decanting of the liquids therein (e.g., electrolyte). If the liquids are instead solidified prior to deconstruction, technicians may physically isolate desired components from waste, e.g., by simply pulling the desired component(s) out of the solidified mass.

In further applications, tunable kinetics of the polymer support system may advantageously reduce shuttling associated with lithium plating and lithium ion mitigation. As a further advantage, the polymer support system may be selectively conductive to lithium ions, without being conductive to polysulfides present within the electrochemical cell.

As a result of the foregoing advantages, especially simplified fabrication, ability to custom design the shape and configuration of electrochemical cells, light weighting, improved mechanical strength and flexibility, protection against electromagnetic radiation, etc. as described herein and as would be understood by skilled artisans upon reading the present descriptions, the inventive electrochemical cells employing polymeric support systems exhibit prolonged operational lifetime compared to otherwise identical electrochemical cells employing conventional metal-based compressive structures. Coupled with improved recyclability, and capability to engineer predetermined failure conditions of the polymeric support system prior to failure of the electrochemical cell, the presently described inventive concepts also reduce the potentially negative environmental impact and economic cost of using lithium sulfur batteries as power sources in myriad applications.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Similarly, the term "about" as utilized herein, particularly as a modifier of a numerical value, shall be understood as referring to a range of values including the expressly stated value and +10% of the expressly stated value. For example, "about 1" shall be understood as encompassing a range of values including 0.9 to 1.1, "about 5" will be understood as encompassing a range of values including 4.5-5.5, etc. as would be appreciated by a person having ordinary skill in the art upon reading the instant disclosure.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

Inventive Concepts

The foregoing detailed description sets forth various aspects, features embodiments, and implementations of the inventive concepts presently disclosed. These inventive concepts, while presented in particular context(s) or in combination with other features, may be combined in any suitable fashion, arrangement, configuration, permutation, etc. that would be appreciated by a person having ordinary skill in the art upon reading this specification in view of the various drawings. Similarly, suitable equivalents of the disclosed concepts may be implemented without departing from the scope thereof. By way of example only, the following inventive concepts are expressly deemed within the scope of the present application.

According to one embodiment, a battery includes an electrochemical cell. The electrochemical cell, in turn, includes an anode; a cathode; and a porous separator that is either directly ionically coupled, or indirectly ionically coupled, to the anode and the cathode. The electrochemical cell also includes a polymer support system comprising a continuous polymer network structurally coupled to the anode and the cathode, wherein the continuous polymer network forms a plurality of continuous pathways between the anode and the cathode.

In select approaches, the anode is or includes lithium, such as anodes comprising lithium-based alloys including but not limited to Li—Mg, Li—Ca, etc. as described herein or as would be understood by a person having ordinary skill in the art upon reading the present disclosure.

In more approaches, the anode and the cathode may independently comprise a plurality of perforations, a mesh, or an expanded metal.

The battery preferably excludes metal-based compressive structures, in various embodiments.

The battery may optionally include an anode current collector electrically coupled to the anode, and a cathode current collector electrically coupled to the cathode. Moreover, the anode current collector and the cathode current collector are each independently configured to contain portions of the continuous polymeric network within an interior volume thereof, e.g., via including perforations, internal void volumes, a mesh-like structure, etc. as would be understood by persons having ordinary skill in the art upon reading the instant disclosure.

Accordingly, the continuous polymer network may, and preferably does, penetrate at least the anode current collector and the cathode current collector. Of course, the continuous polymer network may also penetrates the anode, the porous separator, and the cathode. In such manner, the structural coupling between the anode and the continuous polymer network preferably comprises portions of the continuous polymer network being present in an interior volume of the anode and on an exterior portion of the anode, where the portions of the continuous polymer network present in the interior volume of the anode are covalently bonded to the portions of the continuous polymer network on the exterior portion of the anode; and where the structural coupling between the cathode and the continuous polymer network comprises portions of the continuous polymer network being present in an interior volume of the cathode and on an exterior portion of the cathode, where the portions of the continuous polymer network present in the interior volume of the cathode are covalently bonded to the portions of the continuous polymer network on the exterior portion of the cathode.

The battery as recited in claim 1, wherein the continuous polymer network is ionically conductive, particularly to lithium ions. Meanwhile, the continuous polymer network preferably is not ionically conductive to polysulfides, and the continuous polymer network is electrically non-conductive.

The continuous pathway(s) formed by the polymeric network from the anode to the cathode may include a plurality of covalently bonded components extending an entire distance between the anode and the cathode, or an entire distance between the anode current collector and the cathode current collector.

In myriad embodiments, the continuous polymer network comprises one or more polymers selected from the group consisting of: polytrimethylene terephthalate, polyethersulfone, high density polyethylene, low density polyethylene, linear low density polyethylene, polypropylene, polyolefin copolymers, polystyrene, polystyrene copolymers, polythene, polyvinyl halides, polyvinyl alcohols, polytetrafluoroethylene (TEFLON(R)), polyacrylates, polymethacrylates, polyesters, polyvinylchloride, fluoropolymers, polyamides, polyamide-imides, polyether imides, polyphenylene sulfides, polysulfones, polyacetals, polycarbonates, polyphenylene oxides, polyurethanes, thermoplastic elastomers, epoxies, alkyds, melamines, phenolics, ureas, vinyl esters, epoxies, hybridized crosslinking polymers, cyanate esters, polyurethanes, acrylonitric butadiene styrene (ABS) and polyacrylonitrile (PAN); ethylene vinyl alcohol, poly(methyl methacrylate) (PMMA), polyvinyl cinnamate, polyisoprene, polyamides, polyimides, styrenic block copolymers, bitumen, nitrile rubber, polycarbonate, polyetherimide (PEI), poly(pheylene sulfide) (PPS), polyetheretherketone PEEK), polyetherketones (PEK), and combinations thereof. Some or all of the one or more polymers may be at least partially crosslinked to one another.

Furthermore, the one or more polymers are preferably present in an amount ranging from about 1 wt % of a total weight of the battery to about 25 wt % of the total weight of the battery.

According to some implementations, the polymer support system may exert a positive pressure on the internal volume of the electrochemical cell, and the positive pressure may be characterized by a magnitude of at least about one atmosphere (atm).

Of course, the battery may include external component(s) at least partially surrounding the electrochemical cell. For instance, exemplary external components may be selected from the group consisting of an external casing enclosing the electrochemical cell, a module operatively coupled to the electrochemical cell, an assembly operatively coupled to the electrochemical cell, a pack enclosing the electrochemical cell, a pouch enclosing the electrochemical cell, a can enclosing the electrochemical cell, a tray operatively coupled to the electrochemical cell, a pan operatively coupled to the electrochemical cell, and combinations thereof. The assembly may comprise: a parallel assembly, an in-series assembly, or a cell-to-chassis assembly.

Where included, the external component(s) may be, and preferably are, optically transparent.

In various approaches, the one or more external components may exclude metallic materials, the one or more external components may comprise at least one metallic material, the one or more external components comprise at least one non-metallic material, or the one or more external components may comprise metallic material(s) and non-metallic material(s).

For example, the at least one non-metallic material may be or include one or more polymers selected from the group consisting of: polytrimethylene terephthalate, polyethersulfone, high density polyethylene, low density polyethylene, linear low density polyethylene, polypropylene, polyolefin copolymers, polystyrene, polystyrene copolymers, polythene, polyvinyl halides, polyvinyl alcohols, polytetrafluoroethylene (TEFLON(R)), polyacrylates, polymethacrylates, polyesters, polyvinylchloride, fluoropolymers, polyamides, polyamide-imides, polyether imides, polyphenylene sulfides, polysulfones, polyacetals, polycarbonates, polyphenylene oxides, polyurethanes, thermoplastic elastomers, epoxies, alkyds, melamines, phenolics, ureas, vinyl esters, epoxies, hybridized crosslinking polymers, cyanate esters, polyurethanes, acrylonitric butadiene styrene (ABS) and polyacrylonitrile (PAN); ethylene vinyl alcohol, poly (methyl methacrylate) (PMMA), polyvinyl cinnamate, polyisoprene, polyamides, polyimides, styrenic block copolymers, bitumen, nitrile rubber, polycarbonate, polyetherimide (PEI), poly(pheylene sulfide) (PPS), polyetheretherketone PEEK), polyetherketones (PEK), and combinations thereof. Moreover, some or all of the one or more polymers may be at least partially crosslinked to one another.

The one or more polymers of the non-metallic material preferably are present in an amount ranging from about 1 wt % of a total weight of the battery to about 25 wt % of the total weight of the battery.

In further approaches, the polymer support system may additionally include one or more interpenetrating support structures disposed in the interior volume of the electrochemical cell. The interpenetrating support structures are preferably coupled, mechanically or chemically, to an enclosure containing the electrochemical cell. The enclosure may be part of, or comprise substantially the same composition as, other components of the polymer support system, in various approaches.

In certain arrangements, such as shown in FIG. 3A, the one or more interpenetrating support structures are oriented substantially perpendicular to a longitudinal axis of the anode, the cathode, and the separator (and optionally the anode current collector and the cathode current collector). Of course, these or other interpenetrating support structures may be oriented substantially parallel to a longitudinal axis of the anode, the cathode, the separator, the anode current collector and the cathode current collector without departing from the scope of the presently described inventive concepts.

Preferably, the one or more interpenetrating support structures are ionically conductive, and more preferably, the one or more interpenetrating support structures are ionically conductive to lithium ions. Moreover, the one or more interpenetrating support structures preferably are not ionically conductive to polysulfides, and the one or more interpenetrating support structures are electrically non-conductive.

In some approaches, the one or more interpenetrating support structures may include one or more polymers selected from the group consisting of: polytrimethylene terephthalate, polyethersulfone, high density polyethylene, low density polyethylene, linear low density polyethylene, polypropylene, polyolefin copolymers, polystyrene, polystyrene copolymers, polythene, polyvinyl halides, polyvinyl alcohols, polytetrafluoroethylene (TEFLON(R)), polyacrylates, polymethacrylates, polyesters, polyvinylchloride, fluoropolymers, polyamides, polyamide-imides, polyether imides, polyphenylene sulfides, polysulfones, polyacetals, polycarbonates, polyphenylene oxides, polyurethanes, thermoplastic elastomers, epoxies, alkyds, melamines, phenolics, ureas, vinyl esters, epoxies, hybridized crosslinking polymers, cyanate esters, polyurethanes, acrylonitric butadiene styrene (ABS) and polyacrylonitrile (PAN); ethylene vinyl alcohol, poly(methyl methacrylate) (PMMA), polyvinyl cinnamate, polyisoprene, polyamides, polyimides, styrenic block copolymers, bitumen, nitrile rubber, polycarbonate, polyetherimide (PEI), poly(pheylene sulfide) (PPS), polyetheretherketone (PEEK), polyetherketones (PEK), and combinations thereof. As with other components of the polymer support network, the some or all of the one or more polymers of the interpenetrating support structures are preferably at least partially crosslinked to one another.

The one or more polymers of the interpenetrating support structure(s) may be present in an amount ranging from about 1 wt % of a total weight of the battery to about 25 wt % of the total weight of the battery.

Preferably, some or all of the interpenetrating support structures independently comprise at least one chemical anchor structurally coupled to an exterior of the electrochemical cell, where the at least one chemical anchor comprises: first chemical anchors exhibiting an open state, wherein the open state is indicative that a corresponding portion of the electrochemical cell remains robust against mechanical failure; second chemical anchors exhibiting a fully impinged state, wherein the fully impinged state is indicative that a corresponding portion of the electrochemical cell is subject to imminent mechanical failure; and third chemical anchors exhibiting a locked state, wherein the locked state is indicative that a corresponding portion of the electrochemical cell has experienced a mechanical failure.

Furthermore, the at least one chemical anchor may include one or more polymers selected from the group consisting of: polytrimethylene terephthalate, polyethersulfone, high density polyethylene, low density polyethylene, linear low density polyethylene, polypropylene, polyolefin copolymers, polystyrene, polystyrene copolymers, polythene, polyvinyl halides, polyvinyl alcohols, polytetrafluoroethylene (TEFLON(R)), polyacrylates, polymethacrylates, polyesters, polyvinylchloride, fluoropolymers, polyamides, polyamide-imides, polyether imides, polyphenylene sulfides, polysulfones, polyacetals, polycarbonates, polyphenylene oxides, polyurethanes, thermoplastic elastomers, epoxies, alkyds, melamines, phenolics, ureas, vinyl esters, epoxies, hybridized crosslinking polymers, cyanate esters, polyurethanes, acrylonitric butadiene styrene (ABS) and polyacrylonitrile (PAN); ethylene vinyl alcohol, poly(methyl methacrylate) (PMMA), polyvinyl cinnamate, polyisoprene, polyamides, polyimides, styrenic block copolymers, bitumen, nitrile rubber, polycarbonate, polyetherimide (PEI), poly(pheylene sulfide) (PPS), polyetheretherketone (PEEK), polyetherketones (PEK), and combinations thereof. Preferably, some or all of the one or more polymers are at least partially crosslinked to one another.

The one or more polymers of the chemical anchor(s) are preferably present in an amount ranging from about 1 wt % of a total weight of the battery to about 25 wt % of the total weight of the battery.

In select embodiments, the electrochemical cell is rolled into a cylindrical configuration, also referred to herein as a "jelly roll" configuration. In such embodiments, the polymer support system preferably also includes a polymeric coating coupled to at least some external surfaces of the electrochemical cell and present in interstitial spaces of the rolled cylindrical configuration.

In various implementations, the battery may include one or more external components at least partially surrounding the electrochemical cell (and, in the case of jelly roll configurations, the polymeric coating). For example, the one or more external components may be selected from the group consisting of an external casing enclosing the electrochemical cell, a module operatively coupled to the electrochemical cell, an assembly operatively coupled to the electrochemical cell, a pack enclosing the electrochemical cell, a pouch enclosing the electrochemical cell, a can enclosing the electrochemical cell, a tray operatively coupled to the electrochemical cell, a pan operatively coupled to the electrochemical cell, and combinations thereof. Where the battery includes an assembly, the assembly preferably comprises: a parallel assembly, an in-series assembly, or a cell-to-chassis assembly.

In certain approaches, the one or more external components are optically transparent, to allow inspection of internal components, and/or facilitate optical curing of polymeric precursors.

In various implementations, the one or more external components may include or exclude metallic materials, may include or exclude non-metallic materials (particularly polymeric materials), or may include both metallic and non-metallic materials.

As with other configurations described herein, according to some implementations of a jelly-roll configuration, the polymer support system is ionically conductive, preferably to lithium ions but not to polysulfides. Moreover, the polymer support system preferably is not electrically conductive.

According to another embodiment, a battery includes an electrochemical cell; and a substantially non-metallic protective mechanism for: mitigating or preventing mechanical damage to the electrochemical cell; or mitigating or preventing electrical damage to the electrochemical cell. Importantly, a total weight of the battery is at least about 1% less than a total weight of an otherwise equivalent battery including a substantially metallic protective mechanism for mitigating or preventing the mechanical damage or the electrical damage.

In other words, and according to select implementations, the total weight of the battery is up to about 25% less than the total weight of the otherwise equivalent battery including the substantially metallic protective mechanism for mitigating or preventing the mechanical damage or the electrical damage. Put still yet another way, the substantially non-metallic protective mechanism accounts for a total weight of the battery in a range from approximately 1 wt % of the total weight of the battery to about 20 wt % of the total weight of the battery.

In some approaches, the substantially non-metallic protective mechanism also substantially excludes ceramic materials.

Preferably, the substantially non-metallic protective mechanism substantially excludes at least metals selected from the group consisting of: aluminum, steel, alloys thereof, and combinations thereof.

In various approaches, the substantially non-metallic protective mechanism comprises one or more polymers. The one or more polymers are preferably selected from the group consisting of: polytrimethylene terephthalate, polyethersulfone, high density polyethylene, low density polyethylene, linear low density polyethylene, polypropylene, polyolefin copolymers, polystyrene, polystyrene copolymers, polythene, polyvinyl halides, polyvinyl alcohols, polytetrafluoroethylene (TEFLON(R)), polyacrylates, polymethacrylates, polyesters, polyvinylchloride, fluoropolymers, polyamides, polyamide-imides, polyether imides, polyphenylene sulfides, polysulfones, polyacetals, polycarbonates, polyphenylene oxides, polyurethanes, thermoplastic elastomers, epoxies, alkyds, melamines, phenolics, ureas, vinyl esters, epoxies, hybridized crosslinking polymers, cyanate esters, polyurethanes, acrylonitric butadiene styrene (ABS), polyacrylonitrile (PAN), ethylene vinyl alcohol, poly(methyl methacrylate) (PMMA), polyvinyl cinnamate, polyisoprene, polyamides, polyimides, styrenic block copolymers, bitumen, nitrile rubber, polycarbonate, polyetherimide (PEI), poly(pheylene sulfide) (PPS), polyetherketherketone (PEEK), polyetherketones (PEK), and combinations thereof. Also, at least some of the one or more polymers are preferably at least partially crosslinked to one another, or wherein at least some of the one or more polymers are at least partially crosslinked to one or more components of the electrochemical cell.

More preferably, the substantially non-metallic protective mechanism comprises a continuous network of polymeric precursors extending throughout an interior volume of the electrochemical cell. These precursors may be cured, in which case the substantially non-metallic protective mechanism comprises a continuous network of polymers extending throughout an interior volume of the electrochemical cell.

The substantially non-metallic protective mechanism may additionally or alternatively include one or more interpenetrating support structures disposed in the interior volume of the electrochemical cell and mechanically coupled to an enclosure containing the electrochemical cell. The one or more interpenetrating support structures may be mechanically coupled to the enclosure via one or more chemical anchors of the one or more interpenetrating support structures.

The substantially non-metallic protective mechanism is mechanically coupled to an anode current collector of the electrochemical cell and mechanically coupled to a cathode current collector of the electrochemical cell; and portions of the substantially non-metallic protective mechanism may extend along one or more continuous pathways throughout an interior volume of the electrochemical cell from the anode current collector to the cathode current collector.

In some implementations, at least portions of the substantially non-metallic protective mechanism disposed within an interior volume of the chemical cell comprise one or more lithium ion transporting compounds. For example, the one or more lithium ion transporting compounds may be selected from the group consisting of: palladium (II) oxide, lithium cobalt oxide ($LiCoO_2$), lithium lanthanides, diphenyliodonium hexafluorophosphate (DPIHFP), lithium borohydride ($LiBH_4$) lithium bis(trifluoromethanesulfonyl)imide (LiTFSI) ($LiC_2F_6NO_4S_2$), lithium thiophosphates, NASICON, $Li_{1.3}Al_{0.3}Ti_{1.7}(PO_4)_3$(LATP)), perovskite, $Li_{0.5}La_{0.5}TiO_3$, (LLTO), lithium azide ($Li_3N$), argyrodite ($Li_6PS_5Cl$), and combinations thereof. Preferably, the substantially non-metallic protective mechanism is not ionically conductive to polysulfides, and is electrically non-conductive.

The substantially non-metallic protective mechanism may include a casing or an enclosure surrounding the electrochemical cell. For instance, the electrochemical cell may be arranged in a jelly-roll configuration and contained within an enclosure. Accordingly, the substantially non-metallic protective mechanism may also be present within interstitial spaces between rolled layers of the electrochemical cell.

In various aspects, the battery may include one or more external components at least partially surrounding the electrochemical cell. For example, the one or more external components may be selected from the group consisting of an external casing enclosing the electrochemical cell, a module operatively coupled to the electrochemical cell, an assembly operatively coupled to the electrochemical cell, a pack enclosing the electrochemical cell, a pouch enclosing the electrochemical cell, a can enclosing the electrochemical cell, a tray operatively coupled to the electrochemical cell, a pan operatively coupled to the electrochemical cell, and combinations thereof. Where an assembly is included, the assembly preferably comprises: a parallel assembly, an in-series assembly, or a cell-to-chassis assembly.

Moreover, the one or more external components may be optically transparent.

In particularly preferred approaches, the one or more external components exclude metallic materials, although the one or more external components may comprise metallic material(s), non-metallic material(s), or both metallic materials and non-metallic materials.

It should be understood that, without limitation, mechanical damage mitigated or prevented by the substantially non-metallic protective mechanism may include any permutation or combination of: deformation of the electrochemical cell, penetration of the electrochemical cell by an external object, exposure of the electrochemical cell to an atmosphere external to the electrochemical cell, delamination of layers of internal components of the electrochemical cell, formation of void volume(s) within the internal volume of the electrochemical cell, or combinations thereof. Similarly, without limitation, electrical damage mitigated or prevented by the substantially non-metallic protective mechanism may include any permutation or combination of: formation of short circuit(s) within the interior volume of the electrochemical cell, formation of arc current(s) within the interior volume of the electrochemical cell, surging within the internal volume of the electrochemical cell, or combinations thereof.

According to yet another embodiment, an electrochemical cell includes: an anode; a cathode; a porous separator that is either directly ionically coupled or indirectly ionically coupled to the anode and the cathode; and a plurality of precursors of a polymer support system present in an interior volume of the anode, an interior volume of the porous separator, an interior volume of the cathode. Importantly, the plurality of precursors of the polymer support system are arranged in one or more continuous pathways extending from the anode to the cathode.

In various approaches, the plurality of precursors are selected from the group consisting of: one or more polymeric precursors; one or more initiators; one or more binders; one or more terminators; one or more crosslinkers; one or more carbonaceous materials; one or more scavenging materials; one or more thermosetting materials; one or more solvent systems; one or more phase change materials; one or more lithium ion transporting compounds; and combinations thereof. It should be noted that certain precursors included in the plurality of precursors may be characterized according to more than one of the foregoing generic classifications. For instance, a given polymeric precursor may also be characterized as a crosslinker, a thermosetting material, or a phase change material, etc. as would be understood by those having ordinary skill in the art upon reading the present disclosure.

The one or more polymeric precursors may be, and preferably are, precursors of one or more compounds selected from the group consisting of: polytrimethylene terephthalate, polyethersulfone, high density polyethylene, low density polyethylene, linear low density polyethylene, polypropylene, polyolefin copolymers, polystyrene, polystyrene copolymers, polythene, polyvinyl halides, polyvinyl alcohols, polytetrafluoroethylene (TEFLON(R)), polyacrylates, polymethacrylates, polyesters, polyvinylchloride, fluoropolymers, polyamides, polyamide-imides, polyether imides, polyphenylene sulfides, polysulfones, polyacetals, polycarbonates, polyphenylene oxides, polyurethanes, thermoplastic elastomers, epoxies, alkyds, melamines, phenolics, ureas, vinyl esters, epoxies, hybridized crosslinking polymers, cyanate esters, polyurethanes, acrylonitrile butadiene styrene (ABS) and polyacrylonitrile (PAN); ethylene vinyl alcohol, poly(methyl methacrylate) (PMMA), polyvinyl cinnamate, polyisoprene, polyamides, polyimides, styrenic block copolymers, bitumen, nitrile rubber, polycarbonate, polyetherimide (PEI), poly(pheylene sulfide) (PPS), polyetheretherketone (PEEK), polyetherketones (PEK), and combinations thereof.

Similarly, the one or more initiators may be, and preferably are, selected from the group consisting of: moisture-based initiators, exothermic initiators, endothermic initiators, radical-generating compounds, sources of electromagnetic radiation, and combinations thereof.

Further, the one or more binders may be, and preferably are, selected from the group consisting of: polyacrylate, polyacrylamide (PAM), polyacrylate, polyacrylamide (PAM), cyanoacrylates, aliphatic amines, polyamides, amidoamines, cyclophatic amines, aromatic amines, vinyltrimethoxysilane, and combinations thereof.

Further still, the method as recited in claim 2, wherein the one or more crosslinkers are selected from the group consisting of: amine-based chemicals, polycarbamides, [polyurea], polyamides, dicyandiamide, cycloalpahtic amines, boron trifluoride, amidoamines, aliphatic amines, tetraglycidyldiaminodiphenylmethane, diethyltoluene diamine, aromatic amine curing agents, and combinations thereof.

Yet further still, the one or more carbonaceous materials may be, and preferably are, selected from the group consisting of: carbon black, graphite, pyrolytic graphite, graphene (preferably three-dimensional graphene (3DG), graphene nanoparticles, and/or graphene platelets), single-walled carbon nanotubes (SWCNT), multi-walled carbon nanotubes (MWCNT), carbon nanotubes, carbon nano-onions (CNOs), necked CNOs, carbon nanospheres, fullerenes, hybrid fullerenes, and combinations thereof.

Moreover, the one or more scavenging materials may be, and preferably are, selected from the group consisting of: polypropylene (PP), polyacrylate polyols, phenolic antioxidants, n-octyltriethoxysilane, n-propyltriethoxysilane, trimethylsilyl)isothiocyanate (TMSNCS), aminosilan-based compounds, copper-containing compounds, zinc-containing compounds, iron-containing compounds, polyacrylates, volcanic ash, talc, mica, alumina, silica, cellulose-based materials, metallic reducing agents, metal halides, ascorbic acid, sodium bicarbonate, and combinations thereof.

In various approaches, the one or more thermosetting materials may be, and preferably are, selected from the group consisting of: epoxies, phenocarboxylic acids, bismaleimides, cyanates, esters, polybenzoxazines, crosslinking polymers, photopolymers, carbon fibers, and combinations thereof.

The one or more solvent systems may comprise one or more compounds selected from the group consisting of: dimethyl siloxane (DMSO), tetrabutylammonium hydroxide (TBA), dimethyl formamide (DMF), 1,2-dimethoxyethane (DME), tetrahydrofuran (THF), triethylene glycol dimethyl ether (TEGDME), 2-methyl-2-oxazoline (MOZ), 1,3-Dioxolane (DOL), 3,3-dimethyloxetane (DMO), 2-ethyl-2-oxazoline (EOZ), e-caprolactone (CL), and combinations thereof.

The one or more lithium ion transporting compounds may be, and preferably are, selected from the group consisting of: palladium (II) oxide, lithium cobalt oxide ($LiCoO_2$), lithium lanthanides, diphenyliodonium hexafluorophosphate (DPIHFP), lithium borohydride ($LiBH_4$) lithium bis(trifluoromethanesulfonyl)imide (LiTFSI) ($LiC_2F_6NO_4S_2$), lithium thiophosphates, NASICON, $Li_{1.3}Al_{0.3}Ti_{1.7}(PO_4)_3$ (LATP)), perovskite, $Li_{0.5}La_{0.5}TiO_3$, (LLTO), lithium azide ($Li_3N$), argyrodite ($Li_6PS_5Cl$), and combinations thereof.

The electrochemical cell may additionally include an anode current collector electrically coupled to the anode, and a cathode current collector electrically coupled to the cathode. According to such implementations, the plurality of precursors of the polymer support system are preferably also present in an interior volume of the anode current collector, and an interior volume of the cathode current collector. Moreover, at least some of the one or more continuous pathways extend from the anode current collector to the cathode current collector.

Preferably, the electrochemical cell may be arranged in a jelly-roll configuration and contained within an enclosure. In such arrangements, the plurality of precursors of the polymer support system are preferably also present within interstitial spaces between rolled layers of the electrochemical cell.

In any embodiment of the inventive electrochemical cell, the plurality of precursors are preferably present in an amount ranging from about 1 wt % of a total weight of the electrochemical cell to about 20 wt % of a total weight of the electrochemical cell.

The polymer support system, in some approaches, may also include one or more continuous, interpenetrating pathways present in an interior volume of the electrochemical cell and oriented substantially parallel to, perpendicular to, orthogonal to, diagonal to, etc., a longitudinal axis of the anode, the cathode, and the separator (and where present, the anode current collector and the cathode current collector).

In some embodiments, the electrochemical cell may include or be coupled to one or more external components at least partially surrounding the electrochemical cell. For example, external components may be selected from the group consisting of an external casing enclosing the electrochemical cell, a module operatively coupled to the electrochemical cell, an assembly operatively coupled to the electrochemical cell, a pack enclosing the electrochemical cell, a pouch enclosing the electrochemical cell, a can enclosing the electrochemical cell, a tray operatively coupled to the electrochemical cell, a pan operatively coupled to the electrochemical cell, and combinations thereof. The assembly, when present, comprises: a parallel assembly, an in-series assembly, or a cell-to-chassis assembly.

Moreover, the one or more external components are preferably optically transparent.

In particularly preferred approaches, the one or more external components exclude metallic materials, although the one or more external components may comprise metallic material(s), non-metallic material(s), or both metallic materials and non-metallic materials.

According to one approach, a method for fabricating an electrochemical cell includes assembling a plurality of components of the electrochemical cell. Importantly, the plurality of components include: an anode; a cathode a porous separator either directly ionically coupled or indirectly ionically coupled to the anode and the cathode; and a continuous network of precursors of a polymer support system. The continuous network includes or is present in the form of a plurality of continuous pathways extending from the anode to the cathode, where at least some of the continuous pathways penetrate the anode, the porous separator, and the cathode.

In various approaches, the plurality of precursors are selected from the group consisting of: one or more polymeric precursors; one or more initiators; one or more binders; one or more terminators; one or more crosslinkers; one or more carbonaceous materials; one or more scavenging materials; one or more thermosetting materials; one or more solvent systems; one or more phase change materials; one or more lithium ion transporting compounds; and combinations thereof. It should be noted that certain precursors included in the plurality of precursors may be characterized according to more than one of the foregoing generic classifications. For instance, a given polymeric precursor may also be characterized as a crosslinker, a thermosetting material, or a phase change material, etc. as would be understood by those having ordinary skill in the art upon reading the present disclosure.

The one or more polymeric precursors may be, and preferably are, precursors of one or more compounds selected from the group consisting of: polytrimethylene terephthalate, polyethersulfone, high density polyethylene, low density polyethylene, linear low density polyethylene, polypropylene, polyolefin copolymers, polystyrene, polystyrene copolymers, polythene, polyvinyl halides, polyvinyl alcohols, polytetrafluoroethylene (TEFLON(R)), polyacrylates, polymethacrylates, polyesters, polyvinylchloride, fluoropolymers, polyamides, polyamide-imides, polyether imides, polyphenylene sulfides, polysulfones, polyacetals, polycarbonates, polyphenylene oxides, polyurethanes, thermoplastic elastomers, epoxies, alkyds, melamines, phenolics, ureas, vinyl esters, epoxies, hybridized crosslinking polymers, cyanate esters, polyurethanes, acrylonitric butadiene styrene (ABS) and polyacrylonitrile (PAN); ethylene vinyl alcohol, poly(methyl methacrylate) (PMMA), polyvinyl cinnamate, polyisoprene, polyamides, polyimides, styrenic block copolymers, bitumen, nitrile rubber, polycarbonate, polyetherimide (PEI), poly(pheylene sulfide) (PPS), polyetheretherketone (PEEK), polyetherketones (PEK), and combinations thereof.

Similarly, the one or more initiators may be, and preferably are, selected from the group consisting of: moisture-based initiators, exothermic initiators, endothermic initiators, radical-generating compounds, sources of electromagnetic radiation, and combinations thereof.

Further, the one or more binders may be, and preferably are, selected from the group consisting of: polyacrylate, polyacrylamide (PAM), polyacrylate, polyacrylamide (PAM), cyanoacrylates, aliphatic amines, polyamides, amidoamines, cyclophatic amines, aromatic amines, vinyltrimethoxysilane, and combinations thereof.

Further still, the method as recited in claim 2, wherein the one or more crosslinkers are selected from the group consisting of: amine-based chemicals, polycarbamides, [polyurea], polyamides, dicyandiamide, cycloalpahtic amines, boron trifluoride, amidoamines, aliphatic amines, tetraglycidyldiaminodiphenylmethane, diethyltoluene diamine, aromatic amine curing agents, and combinations thereof.

Yet further still, the one or more carbonaceous materials may be, and preferably are, selected from the group consisting of: carbon black, graphite, pyrolytic graphite, graphene (preferably three-dimensional graphene (3DG), graphene nanoparticles, and/or graphene platelets), single-walled carbon nanotubes (SWCNT), multi-walled carbon nanotubes (MWCNT), carbon nanotubes, carbon nano-onions (CNOs), necked CNOs, carbon nanospheres, fullerenes, hybrid fullerenes, and combinations thereof.

Moreover, the one or more scavenging materials may be, and preferably are, selected from the group consisting of: polypropylene (PP), polyacrylate polyols, phenolic antioxidants, n-octyltriethoxysilane, n-propyltriethoxysilane, trimethylsilyl)isothiocyanate (TMSNCS), aminosilan-based compounds, copper-containing compounds, zinc-containing compounds, iron-containing compounds, polyacrylates, volcanic ash, talc, mica, alumina, silica, cellulose-based materials, metallic reducing agents, metal halides, ascorbic acid, sodium bicarbonate, and combinations thereof.

In various approaches, the one or more thermosetting materials may be, and preferably are, selected from the group consisting of: epoxies, phenocarboxylic acids, bismaleimides, cyanates, esters, polybenzoxazines, crosslinking polymers, photopolymers, carbon fibers, and combinations thereof.

The one or more solvent systems may comprise one or more compounds selected from the group consisting of: dimethyl siloxane (DMSO), tetrabutylammonium hydroxide (TBA), dimethyl formamide (DMF), 1,2-dimethoxyethane (DME), tetrahydrofuran (THF), triethylene glycol dimethyl ether (TEGDME), 2-methyl-2-oxazoline (MOZ), 1,3-Dioxolane (DOL), 3,3-dimethyloxetane (DMO), 2-ethyl-2-oxazoline (EOZ), e-caprolactone (CL), and combinations thereof.

The one or more lithium ion transporting compounds may be, and preferably are, selected from the group consisting of: palladium (II) oxide, lithium cobalt oxide ($LiCoO_2$), lithium lanthanides, diphenyliodonium hexafluorophosphate (DPIHFP), lithium borohydride ($LiBH_4$) lithium bis(trifluoromethanesulfonyl)imide (LiTFSI) ($LiC_2F_6NO_4S_2$), lithium thiophosphates, NASICON, $Li_{1.3}Al_{0.3}Ti_{1.7}(PO_4)_3$(LATP)), perovskite, $Li_{0.5}La_{0.5}TiO_3$, (LLTO), lithium azide ($Li_3N$), argyrodite ($Li_6PS_5Cl$), and combinations thereof.

With continuing reference to the exemplary method, fabrication may additionally include coating external surface(s) of the electrochemical cell with the precursors of the polymer support system; and curing the precursors, e.g., to form a casing surrounding the electrochemical cell.

Additionally or alternatively, the method may include curing the plurality of precursors to form the polymer support system. The curing may be driven, in whole or in part, via one or more chemical reactions, thermally, kinetically, optically, or any combination of said curing mechanisms, according to various approaches.

Similarly, the exemplary fabrication method may include at least partially crosslinking polymers of the polymer support system.

In particularly preferred embodiments, the method involves arranging the electrochemical cell in a jelly-roll configuration, where the precursors of the polymeric support system are present in interstitial spaces of the jelly-roll configuration.

In select embodiments, the method may additionally or alternatively include forming one or more interpenetrating support structure precursors within the electrochemical cell, each interpenetrating support structure independently comprising the precursors of the polymer support system; and curing the precursors to form the interpenetrating support structures within the electrochemical cell. Some or all of the interpenetrating support structures may independently comprise a chemical anchor configured to provide mechanical strength to the electrochemical cell and to provide indica of impending mechanical failure of the electrochemical cell.

Moreover, the interpenetrating support structures may be aligned along a direction parallel to a longitudinal axis of the porous separator, the interpenetrating support structures are aligned along a direction perpendicular to a longitudinal axis of the porous separator, or the interpenetrating support structures may be aligned both directions, among others (such as diagonally, orthogonally, etc. within the electrochemical cell).

The assembly, in various approaches, may utilize one or more techniques selected from the group consisting of: additive manufacturing, injection molding, compression molding, hybrid injection and compression molding, preforming, hand layup techniques, casting, infusion, sintering, and combinations thereof. In some approaches, the assembled plurality of components may further comprise an anode current collector electrically coupled to the anode, and a cathode current collector electrically coupled to the cathode. In such embodiments, at least some of the plurality of continuous pathways extend from the anode current collector to the cathode current collector; and at least some of the continuous pathways penetrate the anode current collector and the anode current collector.

To be clear, the inventive concepts presented herein include various embodiments, applications, implementations, configurations, and features. These concepts shall be understood as capable of being combined in any suitable manner that would be appreciated by a person having ordinary skill in the art upon reading the present descriptions and reviewing the accompanying Figures, unless expressly stated otherwise herein. The foregoing inventive concepts are provided by way of example, and should not be construed as limiting the scope of the invention in any way.

What is claimed is:

1. An electrochemical cell, comprising:
   an anode;
   a cathode;
   a porous separator, directly ionically coupled or indirectly ionically coupled to the anode and the cathode; and
   a plurality of precursors of a polymer support system present in an interior volume of the anode, an interior volume of the porous separator, and an interior volume of the cathode; and
   wherein the plurality of precursors of the polymer support system are arranged in one or more continuous pathways extending from the anode to the cathode.

2. The electrochemical cell as recited in claim 1, wherein the plurality of precursors of the polymer support system is selected from the group consisting of:
   one or more polymeric precursors;
   one or more initiators;
   one or more binders;
   one or more terminators;
   one or more crosslinkers;
   one or more carbonaceous materials;
   one or more scavenging materials;
   one or more thermosetting materials;
   one or more solvent systems;
   one or more phase change materials;
   one or more lithium ion transporting compounds; and
   combinations thereof.

3. The electrochemical cell as recited in claim 2, wherein the one or more polymeric precursors are precursors of one or more compounds selected from the group consisting of: polytrimethylene terephthalate, polyethersulfone, high density polyethylene, low density polyethylene, linear low density polyethylene, polypropylene, polyolefin copolymers, polystyrene, polystyrene copolymers, polythene, polyvinyl halides, polyvinyl alcohols, polytetrafluoroethylene (TEFLON(R)), polyacrylates, polymethacrylates, polyesters, polyvinylchloride, fluoropolymers, polyamides, polyamide-imides, polyether imides, polyphenylene sulfides, polysulfones, polyacetals, polycarbonates, polyphenylene oxides, polyurethanes, thermoplastic elastomers, epoxies, alkyds, melamines, phenolics, ureas, vinyl esters, hybridized crosslinking polymers, cyanate esters, polyurethanes, acrylonitric butadiene styrene (ABS) and polyacrylonitrile (PAN); ethylene vinyl alcohol, poly(methyl methacrylate) (PMMA), polyvinyl cinnamate, polyisoprene, polyimides, styrenic block copolymers, bitumen, nitrile rubber, polycarbonate, polyetherimide (PEI), poly(pheylene sulfide) (PPS), polyetheretherketone (PEEK), polyetherketones (PEK), and combinations thereof.

4. The electrochemical cell as recited in claim 2, wherein the one or more initiators are selected from the group consisting of: moisture-based initiators, exothermic initiators, endothermic initiators, radical-generating compounds, sources of electromagnetic radiation, and combinations thereof.

5. The electrochemical cell as recited in claim 2, wherein the one or more binders are selected from the group consisting of: polyacrylate, polyacrylate, polyacrylamide (PAM), cyanoacrylates, aliphatic amines, polyamides, amidoamines, cyclophatic amines, aromatic amines, vinyltrimethoxysilane, and combinations thereof.

6. The electrochemical cell as recited in claim 2, wherein the one or more crosslinkers are selected from the group consisting of: amine-based chemicals, polycarbamides, polyamides, dicyandiamide, cycloalpahtic amines, boron trifluoride, amidoamines, aliphatic amines, tetraglycidyldiaminodiphenylmethane, diethyltoluene diamine, aromatic amine curing agents, and combinations thereof.

7. The electrochemical cell as recited in claim 2, wherein the one or more carbonaceous materials are selected from the group consisting of: carbon black, graphite, pyrolytic graphite, graphene (preferably three-dimensional graphene (3DG), graphene nanoparticles, and/or graphene platelets), single-walled carbon nanotubes (SWCNT), multi-walled carbon nanotubes (MWCNT), carbon nanotubes, carbon nano-onions (CNOs), necked CNOs, carbon nanospheres, fullerenes, hybrid fullerenes, and combinations thereof.

8. The electrochemical cell as recited in claim 2, wherein the one or more scavenging materials are selected from the group consisting of: polypropylene (PP), polyacrylate polyols, phenolic antioxidants, n-octyltriethoxysilane, n-propyltriethoxysilane, trimethylsilyl)isothiocyanate (TMSNCS), aminosilan-based compounds, copper-containing compounds, zinc-containing compounds, iron-containing compounds, polyacrylates, volcanic ash, talc, mica, alumina, silica, cellulose-based materials, metallic reducing agents, metal halides, ascorbic acid, sodium bicarbonate, and combinations thereof.

9. The electrochemical cell as recited in claim 2, wherein the one or more thermosetting materials are selected from the group consisting of: epoxies, phenocarboxylic acids (phenolic), bismaleimides, cyanates, esters, polybenzoxazines, crosslinking polymers, photopolymers, carbon fibers, and combinations thereof.

10. The electrochemical cell as recited in claim 2, wherein the one or more solvent systems comprise one or more compounds selected from the group consisting of: dimethyl siloxane (DMSO), tetrabutylammonium hydroxide (TBA) and/or dimethyl formamide (DMF), 1,2-dimethoxyethane (DME), tetrahydrofuran (THF), triethylene glycol dimethyl ether (TEGDME), 2-methyl-2-oxazoline (MOZ), 1,3-Dioxolane (DOL), 3,3-dimethyloxetane (DMO), 2-ethyl-2-oxazoline (EOZ), e-caprolactone (CL), and combinations thereof.

11. The electrochemical cell as recited in claim 2, wherein the one or more lithium ion transporting compounds are selected from the group consisting of: palladium (II) oxide, lithium cobalt oxide ($LiCoO_2$), lithium lanthanides, diphenyliodonium hexafluorophosphate (DPIHFP), lithium borohydride ($LiBH_4$) lithium bis(trifluoromethanesulfonyl)imide (LiTFSI) ($LiC_2F_6NO_4S_2$), lithium thiophosphates, NASICON, $Li_{1.3}Al_{0.3}Ti_{1.7}(PO_4)_3$(LATP)), perovskite, $Li_{0.5}La_{0.5}TiO_3$, (LLTO), lithium azide ($Li_3N$), argyrodite ($Li_6PS_5Cl$), and combinations thereof.

12. The electrochemical cell as recited in claim 1, comprising an anode current collector electrically coupled to the anode, and a cathode current collector electrically coupled to the cathode.

13. The electrochemical cell as recited in claim 12, wherein the plurality of precursors of the polymer support system are also present in an interior volume of the anode current collector.

14. The electrochemical cell as recited in claim 12, wherein the plurality of precursors of the polymer support system are also present in an interior volume of the cathode current collector.

15. The electrochemical cell as recited in claim 12, wherein at least some of the one or more continuous pathways extend from the anode current collector to the cathode current collector.

16. The electrochemical cell as recited in claim 1, wherein the electrochemical cell is arranged in a jelly-roll configuration and contained within an enclosure.

17. The electrochemical cell as recited in claim 1, wherein the plurality of precursors of the polymer support system are also present within interstitial spaces between rolled layers of the electrochemical cell.

18. The electrochemical cell as recited in claim 1, wherein the plurality of precursors are present in an amount ranging from about 1 wt % of a total weight of the electrochemical cell to about 20 wt % of a total weight of the electrochemical cell.

19. The electrochemical cell as recited in claim 1, wherein the polymer support system comprises one or more continuous, interpenetrating pathways present in an interior volume of the electrochemical cell and oriented substantially perpendicular to a longitudinal axis of the anode, the cathode, and the separator.

20. The electrochemical cell as recited in claim 1, comprising one or more external components at least partially surrounding the electrochemical cell.

21. The electrochemical cell as recited in claim 20, wherein the one or more external components are selected from the group consisting of an external casing enclosing the electrochemical cell, a module operatively coupled to the electrochemical cell, an assembly operatively coupled to the electrochemical cell, a pack enclosing the electrochemical cell, a pouch enclosing the electrochemical cell, a can enclosing the electrochemical cell, a tray operatively coupled to the electrochemical cell, a pan operatively coupled to the electrochemical cell, and combinations thereof; and
wherein the assembly comprises: a parallel assembly, an in-series assembly, or a cell-to-chassis assembly.

22. The electrochemical cell as recited in claim 20, wherein the one or more external components are optically transparent.

23. The electrochemical cell as recited in claim 20, wherein the one or more external components exclude metallic materials.

24. The electrochemical cell as recited in claim 20, wherein the one or more external components comprise at least one non-metallic material.

25. The electrochemical cell as recited in claim 1, comprising the polymer support system, wherein the polymer support system comprises cured polymers formed from the plurality of precursors.

26. The electrochemical cell as recited in claim 25, wherein at least some of the cured polymers penetrate the anode, the porous separator, and the cathode along the one or more continuous pathways extending from the anode to the cathode.

27. The electrochemical cell as recited in claim 1, wherein the polymer support system comprises one or more cured interpenetrating support structures disposed in the interior volume of the electrochemical cell and mechanically or chemically coupled to an enclosure containing the electrochemical cell.

28. The electrochemical cell as recited in claim 27, wherein at least some of the cured interpenetrating support structures penetrate the anode, the porous separator, and the cathode.

29. A battery comprising the electrochemical cell as recited in claim 25, wherein the polymer support system provides equivalent or better mechanical strength to the battery as a metal-based compressive structure, wherein the battery excludes any metal-based compressive structures, and wherein a total weight of the battery is in a range from at least about 1% to about 25% less than a total weight of an otherwise substantially identical battery including a conventional, metal-based compressive structure.

30. The electrochemical cell as recited in claim 16, wherein either or both of the electrochemical cell and the enclosure are independently arranged in a substantially cylindrical configuration.

\* \* \* \* \*